(12) United States Patent
Burns et al.

(10) Patent No.: US 9,103,315 B2
(45) Date of Patent: Aug. 11, 2015

(54) BOUYANT ACTUATOR

(75) Inventors: Alan Robert Burns, Douglas (IM); Petru Tinc, Ocean Reef (AU); Matt Keys, Cottesloe (AU)

(73) Assignee: CETO IP PTY LTD., West Perth, Western Australia (AU)

( * ) Notice: Subject to any disclaimer, the term of this patent is extended or adjusted under 35 U.S.C. 154(b) by 1016 days.

(21) Appl. No.: 12/808,653

(22) PCT Filed: Dec. 17, 2008

(86) PCT No.: PCT/AU2008/001853
§ 371 (c)(1),
(2), (4) Date: Nov. 11, 2011

(87) PCT Pub. No.: WO2009/076712
PCT Pub. Date: Jun. 25, 2009

(65) Prior Publication Data
US 2012/0102938 A1   May 3, 2012

(30) Foreign Application Priority Data
Dec. 17, 2007   (AU) ................................ 2007906886

(51) Int. Cl.
*F03B 13/18* (2006.01)
*F04B 17/00* (2006.01)
*F03B 13/14* (2006.01)

(52) U.S. Cl.
CPC ................ *F03B 13/14* (2013.01); *F03B 13/187* (2013.01); *F05B 2220/707* (2013.01); *F05B 2240/97* (2013.01); *F05B 2250/241* (2013.01); *Y02E 10/38* (2013.01)

(58) Field of Classification Search
CPC .................... F03B 13/12–13/24; F04B 35/004; E02B 9/08; B63B 2035/4466; Y02E 10/32; Y02E 10/38
USPC .......... 60/495–507; 417/330–333; 290/42, 53
See application file for complete search history.

(56) References Cited

U.S. PATENT DOCUMENTS 3,126,830 A * 3/1964 Dilliner .......................... 417/331
4,453,894 A * 6/1984 Ferone et al. .................. 417/332
(Continued)

FOREIGN PATENT DOCUMENTS

CN    1800629    7/2006
FR    2 289 763    5/1976
(Continued)

OTHER PUBLICATIONS

ARIPO Search and Examination report dated May 9, 2013, 3 pages.
(Continued)

*Primary Examiner* — Christopher Jetton
(74) *Attorney, Agent, or Firm* — Merchant & Gould P.C.

(57) ABSTRACT

A buoyant actuator (19) for coupling wave motion to a device operable in response to wave motion in a body of water. The buoyant actuator (19) comprises a generally spherical body (20) defining an exterior surface and a hollow interior adapted to contain water received from the body of water. The exterior surface comprises a plurality of facets (101) which are tessellated. Typically, there are 36 facets (101), of which 12 comprise generally pentagonal facets (105) and 24 comprise generally hexagonal facets (107). The body (20) comprises a plurality of openings (143) for fluid flow between the hollow interior and the surrounding body of water. A closure configured as a flap (145) is provided for each opening (143) to block or at least inhibit fluid flow therethrough, the closure being adapted to move away from the opening to permit fluid flow therethrough in response to a predetermined fluid pressure differential imposed thereon between the hollow interior and the surrounding body of water. The exterior surface of the body (20) is configured to viscously couple with water surrounding the body (20). The viscous coupling between the surrounding water and the exterior surface of the body (20) provides added effective mass to the buoyant actuator (19) which is additional to the physical mass of the buoyant actuator and the mass of the volume of water contained in the body.

34 Claims, 25 Drawing Sheets

(56) References Cited

U.S. PATENT DOCUMENTS

| | | | |
|---|---|---|---|
| 6,768,216 B1 | 7/2004 | Carroll et al. | |
| 6,933,632 B2 | 8/2005 | Braml et al. | |
| 7,040,089 B2 * | 5/2006 | Andersen | 60/398 |
| 2002/0154725 A1 * | 10/2002 | Hayman, III | 376/317 |
| 2003/0155774 A1 | 8/2003 | Chalmers et al. | |
| 2004/0217597 A1 | 11/2004 | Carroll et al. | |

FOREIGN PATENT DOCUMENTS

| | | |
|---|---|---|
| JP | 2002257022 | 9/2002 |
| JP | 2003014878 | 1/2003 |
| WO | WO 86/04391 | 7/1986 |
| WO | WO 99/13218 | 3/1999 |
| WO | WO 03/071128 | 8/2003 |
| WO | WO 2008/052286 | 5/2008 |

OTHER PUBLICATIONS

Australian Office Action (dated Dec. 8, 2011) for Appln. No. 2008338244, 1 page.
Chinese Office Action (dated Oct. 8, 2012) for Appln. No. 200880125578.2 (English translation), 17 pages.
Colombian Office Action for Appln. No. 10-084 574, (with partial English translation), 10 pages.
Indonesian Office Action (dated Sep. 18, 2012) for Appln. No. W00201002432, (with partial English translation), 3 pages.
Israel Office Action (dated Jun. 27, 2012) for Appln. No. 206427, (with partial English translation), 4 pages.
Japanese Office Action (dated Apr. 2, 2013) for Appln. No. 2010-538274 (English translation), 6 pages.
Philippines Office Action (dated Mar. 13, 2013) for Appln. No. 1/2010/501377, 1 page.
Korean Office Action from corresponding Korean Application No. 10-2010-7015242 mailed Feb. 2, 2015 (7 pages).

* cited by examiner

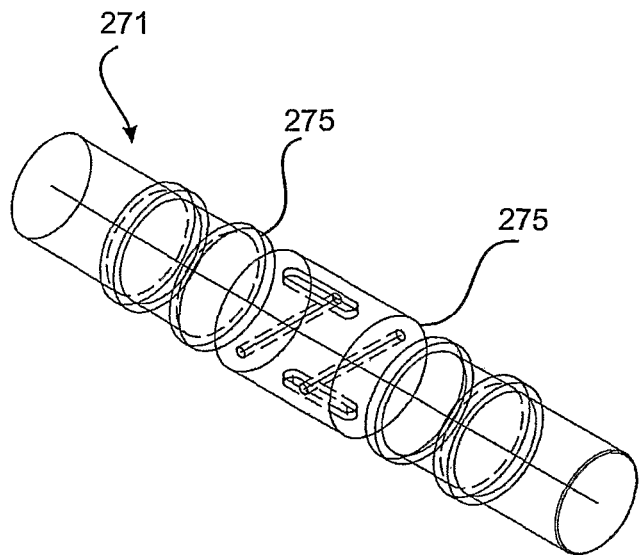
Fig 18
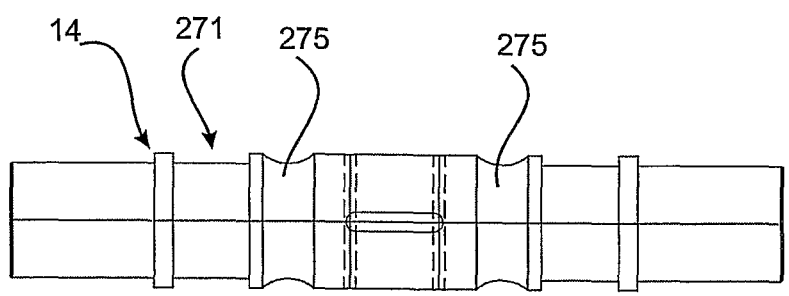
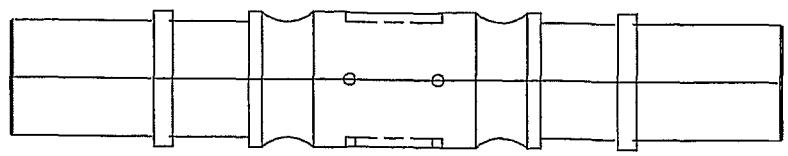
Fig 19

BOUYANT ACTUATOR

This application is a National Stage Application of PCT/AU 2008/001853, filed 17 Dec. 2008, which claims benefit of Ser. No. 2007906886, filed 17 Dec. 2007 in Australia and which applications are incorporated herein by reference. To the extent appropriate, a claim of priority is made to each of the above disclosed applications.

FIELD OF THE INVENTION

This invention relates to a buoyant actuator responsive to wave motion, and more particularly a buoyant actuator for coupling wave motion to a device operable in response to wave motion. The invention also relates to a wave energy conversion system.

The invention has been devised particularly, although not necessarily solely, as a buoyant actuator for harnessing wave energy and for converting the harnessed energy to linear motion for driving an energy conversion device such as a fluid pump or a linear electric generator. In such an arrangement, the buoyant actuator may be operably connected to the energy conversion device, the actuator being buoyantly suspended within the body of water, but typically below the water surface. The buoyant actuator is in effect a submerged float which moves in response to wave action within the body of water.

BACKGROUND ART

The following discussion of the background art is intended to facilitate an understanding of the present invention only. The discussion is not an acknowledgement or admission that any of the material referred to is or was part of the common general knowledge as at the priority date of the application.

It is known to couple wave motion to a device operable in response to wave motion, one example of which is use of a float to translate wave motion into a reciprocating pump action. Typically such floats are of solid construction and comprise buoyant material such as foam.

While such floats are effective in providing buoyancy, they can be heavy.

When exposed to an aggressive sea state, typically adverse weather conditions (such as in storm conditions), floats can be subject to extreme forces. Known floats can be prone to damage or collapse when exposed to such conditions. Further, tethers to which the floats are connected can be damaged or ruptured in such conditions.

Furthermore, such floats are generally not well-suited for intercepting the horizontal wave motions that exist in shallow water conditions.

It is against this background and the problems and difficulties associated therewith that the present invention has been developed. Accordingly, it is an object of the present invention to address at least one of the problems or difficulties of previously known floats, or at least provide a useful choice as an alternative.

BRIEF DESCRIPTION OF THE INVENTION

According to a first aspect of the invention there is provided a buoyant actuator comprising a body defining an exterior surface comprising a plurality of facets, and means for opening the body to permit water flow therethrough.
Preferably, the facets are tessellated.
Preferably, the body is generally spherical.

Preferably there are 36 facets, of which 12 comprise generally pentagonal facets and 24 comprise generally hexagonal facets.

Preferably the body is substantially hollow but comprises an internal support structure.

Preferably, the internal support structure comprises a plurality of struts each having an outer end supporting one of the facets.

Where the body comprises 36 facets with 12 pentagonal facets, there are preferably 12 struts, one supporting each pentagonal facet.

Preferably, the internal structure comprises a central core and the struts extend radially from the central core.

Preferably, each strut is configured at its radially outer end to define the respective facet.

Preferably, the facets at the ends of the struts are connected to adjacent facets to provide integrity to the body.

Preferably, the internal structure is of buoyant construction. The buoyancy may be provided by incorporating buoyant material such as foam in the construction of at least some of the struts and/or the central core.

Preferably, the means for opening the body to permit water to flow therethrough is operable in response to exposure of the buoyant actuator to an aggressive sea state in adverse weather conditions (such as storm conditions). This is for the purpose of maintaining the integrity of the buoyant actuator when exposed to such conditions.

This may be achieved by establishing openings in the exterior surface in response to the adverse weather conditions imposed upon the buoyant actuator. In this regard, a plurality of the facets may be configured as hinged flaps each pivotally movable between a closed condition which it normally occupies and which is in the plane of the facet, and an open condition in which it swings outwardly to establish the opening in the exterior surface. Conveniently, each such facet comprises a pair of the flaps hingedly connected together for pivotal movement between the closed and open conditions.

Each flap may be biased towards its closed condition. This may be achieved by use of a spring mechanism, such as incorporation of a spring in the hinge for the flap.

Preferably, a releasable coupling is provided for releasably maintaining each flap in the closed condition. The releasable coupling is preferably adapted to actuate to release the flap to allow it to move from the closed condition to the open condition to establish the opening in response to the adverse weather conditions.

Preferably, the releasable coupling comprises a magnetic coupling. The magnetic coupling may utilise a magnetic attractive force to maintain the flap in the closed condition. The magnetic coupling may comprise a plurality of magnets provided at locations along the free edge of the respective flap and/or at corresponding locations along corresponding edges of adjacent facets. In this way, the flaps will remain in closed conditions defining the respective facets until the force against them is sufficient to overcome the magnetic attraction, thus forcing the flaps to release and swing away from the closed condition to establish the opening.

Where the body comprises 36 facets with 24 hexagonal facets, at least some of the hexagonal facets are configured as two semi-hexagonal flaps. Preferably, each such hexagonal facet comprises two semi-hexagonal flaps.

The number of facets configured as flaps may be dependent on the particular application of the buoyant actuator. If the buoyant actuator is connected to a single device (such as a pump) operable in response to wave motion, then it may be that only two facets (such as facets at the top and bottom of the body) are configured as flaps. If the buoyant actuator is connected to a plurality of devices (such as pumps disposed in a spaced apart array) operable in response to wave motion, then it is very likely that more than two, and perhaps at least the majority of the facets, would be configured as flaps The buoyant actuator need not be completely watertight in order to function. Indeed in normal operation the buoyant actuator is filled with water and this entrapped water moves with the buoyant actuator as a contiguous entity even if there is a slight flow between the tessellated facets and any flaps incorporated in the body.

The buoyant actuator is typically fault tolerant to flap failure. If one flap were to fail open in normal operation, there would still not be a flow passage established for water to enter and then leave the hollow interior of the buoyancy actuator to an extent which would adversely affect its operation. For there to be flow that might adversely affect operation of the buoyant actuator there would typically need to be at least two flaps open, and the probability of two flaps failing open is considerably less than the probability of just one flap failing.

According to a second aspect of the invention there is provided a buoyant actuator comprising a body defining an exterior surface and a hollow interior, and means for opening the body to permit water to flow therethrough in response to exposure of the buoyant actuator to an aggressive sea state in adverse weather conditions (such as storm conditions).

According to a third aspect of the invention there is provided a buoyant actuator for immersion in a body of water, the buoyant actuator comprising a body defining an exterior surface and a hollow interior adapted to contain water from the body of water, the body comprising a plurality of openings for fluid flow between the hollow interior and the surrounding body of water, and a closure for each opening to block or at least inhibit fluid flow therethrough, the closure being adapted to move away from the opening to permit fluid flow therethrough in response to a predetermined fluid pressure differential imposed thereon between the hollow interior and the surrounding body of water.

According to a fourth aspect of the invention there is provided a buoyant actuator for immersion in a body of water, the buoyant actuator comprising a body defining a hollow interior adapted to receive a volume of water from the surrounding water body, the body having openings through which water can flow between the hollow interior and the water body, and a flow control means for controlling flow through the hollow interior, the flow control means having a first condition for blocking or at least impeding fluid flow through the body and a second condition permitting fluid flow through the hollow interior.

The body may define an exterior surface and the openings may be provided in the exterior surface.

The flow control means may comprise a closure for each opening to block or at least inhibit fluid flow therethrough, the closure being adapted to move away from the opening to permit fluid flow therethrough.

Each closure may be configured as a flap movable between a closed condition in the plane of the exterior surface, and an open condition in which it swings away to establish the opening in the exterior surface.

According to a fifth aspect of the invention there is provided a buoyant actuator for immersion in a body of water, the buoyant actuator comprising a body defining an exterior surface and a hollow interior, the exterior surface being configured to viscously couple with surrounding water, and means for establishing openings in the exterior surface to permit fluid flow between the surrounding water and the hollow interior.

According to a sixth aspect of the invention there is provided a buoyant actuator for immersion in a body of water, the buoyant actuator comprising a body defining an exterior surface and a hollow interior, the exterior surface being configured to viscously couple with surrounding water, and a plurality of openings for fluid flow between the hollow interior and the surrounding water, and a closure for each opening to block or at least inhibit fluid flow therethrough, the closure being adapted to move away from the opening to permit fluid flow therethrough in response to a predetermined fluid pressure differential imposed thereon between the hollow interior and the surrounding water.

The viscous coupling between the surrounding water and the exterior surface of the buoyant actuator provides added effective mass to the buoyant actuator. This added mass is additional to the physical mass of the buoyant actuator and the mass of the volume of water contained in the body. The forces of the wave motion act on the total mass comprising the added effective mass together with the physical mass of the buoyant actuator and the mass of the volume of water contained in the body.

The viscous coupling is reduced upon establishment of the openings. The establishment of the openings allows water to flow through the buoyant actuator to thereby impact upon its movement in the body of water. In effect, the establishment of the openings reduces the effective size or profile of the buoyant actuator that is apparent to the moving water in which it is immersed. In particular, there is a reduction in the velocity and amplitude of motion of the buoyant actuator within the body of water. The reduction of velocity also leads to a reduction in the effective mass of the buoyant actuator. This thus allows the buoyant actuator to assume a condition in which it is less response and also less vulnerable to damage in adverse sea conditions.

According to a seventh aspect of the invention there is provided a wave energy conversion system comprising a buoyant actuator according to any one of the preceding aspects of the inventions as set forth above.

Preferably, the buoyant actuator is operably connected to an energy conversion device (such as a fluid pump or a linear electric generator) to translate wave action thereto.

BRIEF DESCRIPTION OF THE DRAWINGS

The invention will be better understood by reference to the following description of one specific embodiment thereof as shown in the accompanying drawings in which:

FIG. 18 is a perspective view of a shaft forming part of the reciprocating pump;

FIG. 19 is a side elevational view of the shaft;

BEST MODE(S) FOR CARRYING OUT THE INVENTION

Figure 1:
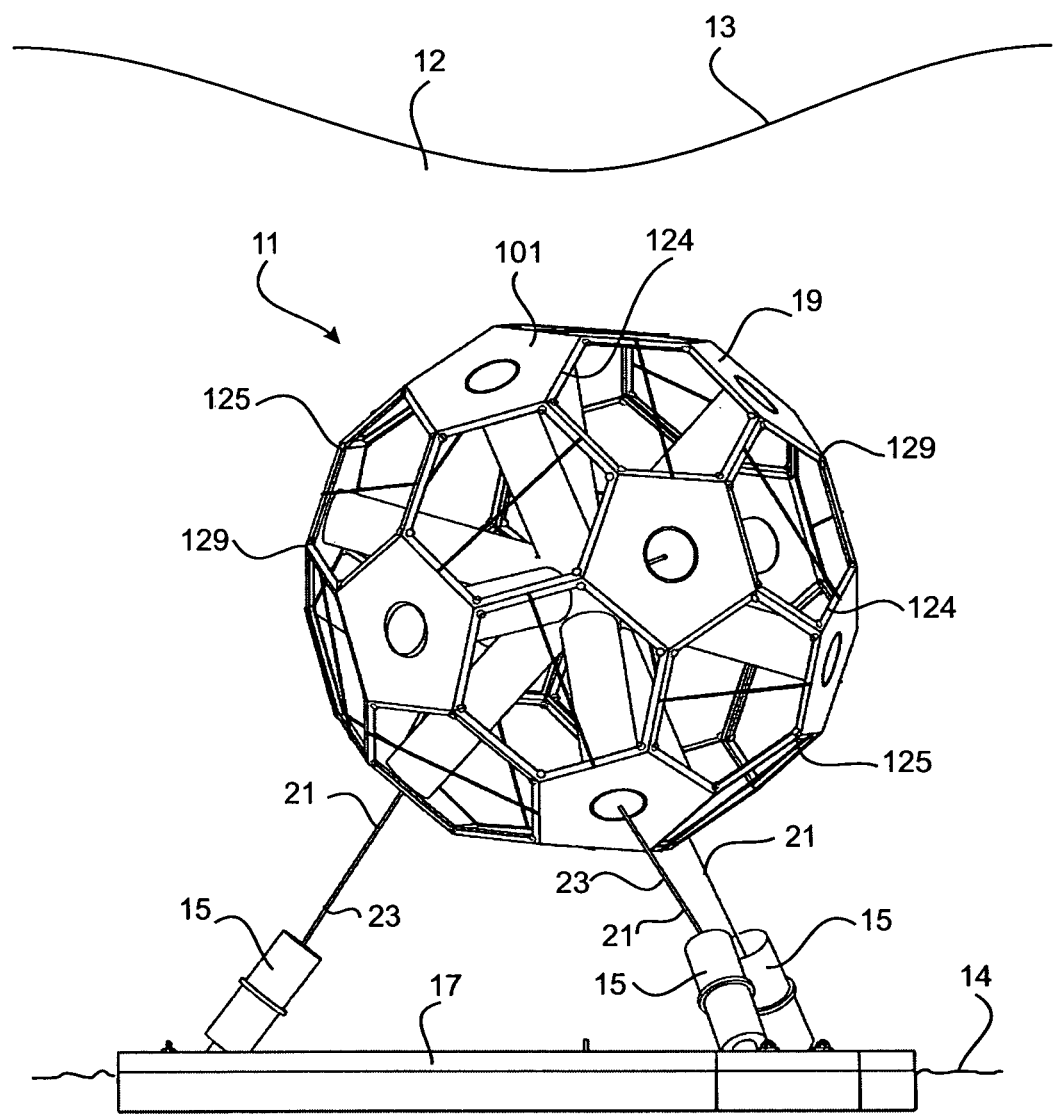
FIG. 1 is a schematic elevational view of apparatus incorporating a buoyant actuator according to the embodiment, the apparatus being shown installed in position under water.

Referring to the drawings, there is shown a buoyancy actuator 19 used in apparatus 11 for harnessing wave energy in a body of water and for converting the harnessed energy to high pressure fluid, typically above 0.7 MPa and preferably above 5.5 MPa. The high pressure fluid can be used for any appropriate purpose. In the arrangement shown, the high pressure fluid comprises water used for power generation and/or desalination.

The apparatus 11 is installed for operation in a body of seawater 12 having a water surface 13 and a seabed 14.

The apparatus 11 comprises a plurality of pumps 15 anchored within the body of water 12 and adapted to be activated by wave energy. The pumps 15 are attached to a base 17 anchored to the seabed 14. Each pump 15 is operably connected to a buoyant actuator 19 according to the embodiment buoyantly suspended within the body of seawater 12 above the pumps but below the water surface 13 at a depth such that it is typically a few meters below the neutral water line. With this arrangement, each pump 15 is activated by movement of the buoyant actuator 19 in response to wave motion.

Each pump 15 is operatively connected to the buoyant actuator 19 by a coupling 21 comprising a tether 23. The pumps 15 provide high pressure fluid (water in . . . this embodiment) to a closed loop system in which energy in the form of the high pressure fluid is exploited.

The pumps 15 each comprises a reciprocating pump having a low pressure inlet 27 and a high pressure outlet 29.

Figure 2:
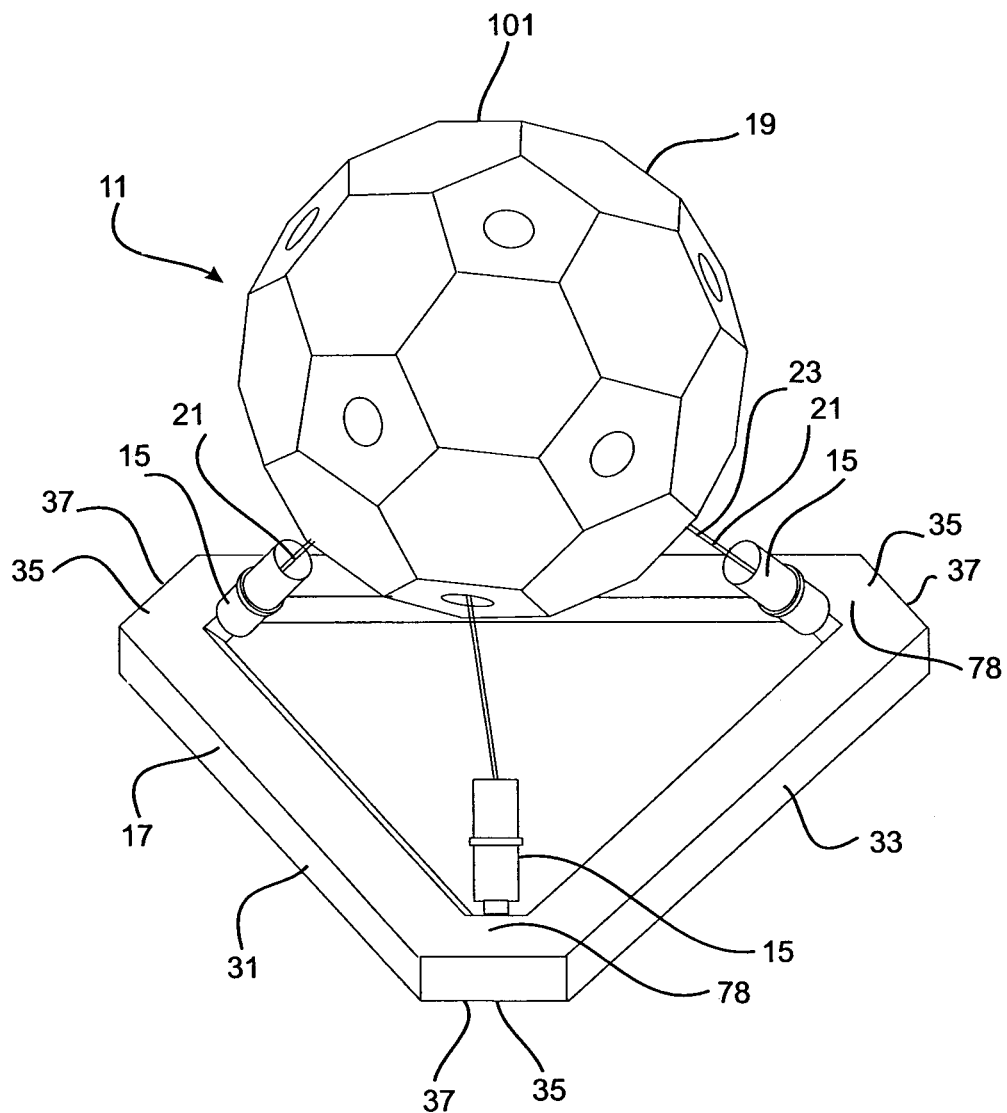
FIG. 2 is a schematic perspective view of the apparatus.

In the illustrated arrangement, the base 17 comprises a generally triangular structure 31 having three sides 33 interconnected at corners 35 which are truncated to define edges 37, as best seen in FIG. 2. There are three pumps 15, with one of the three pumps connected to each corner 35 of the triangular base. Each pump 15 is also connected to the buoyant actuator 19 by way of the tether 23. The tethers 23 are made of any appropriate material, such as synthetic rope.

Figure 4:
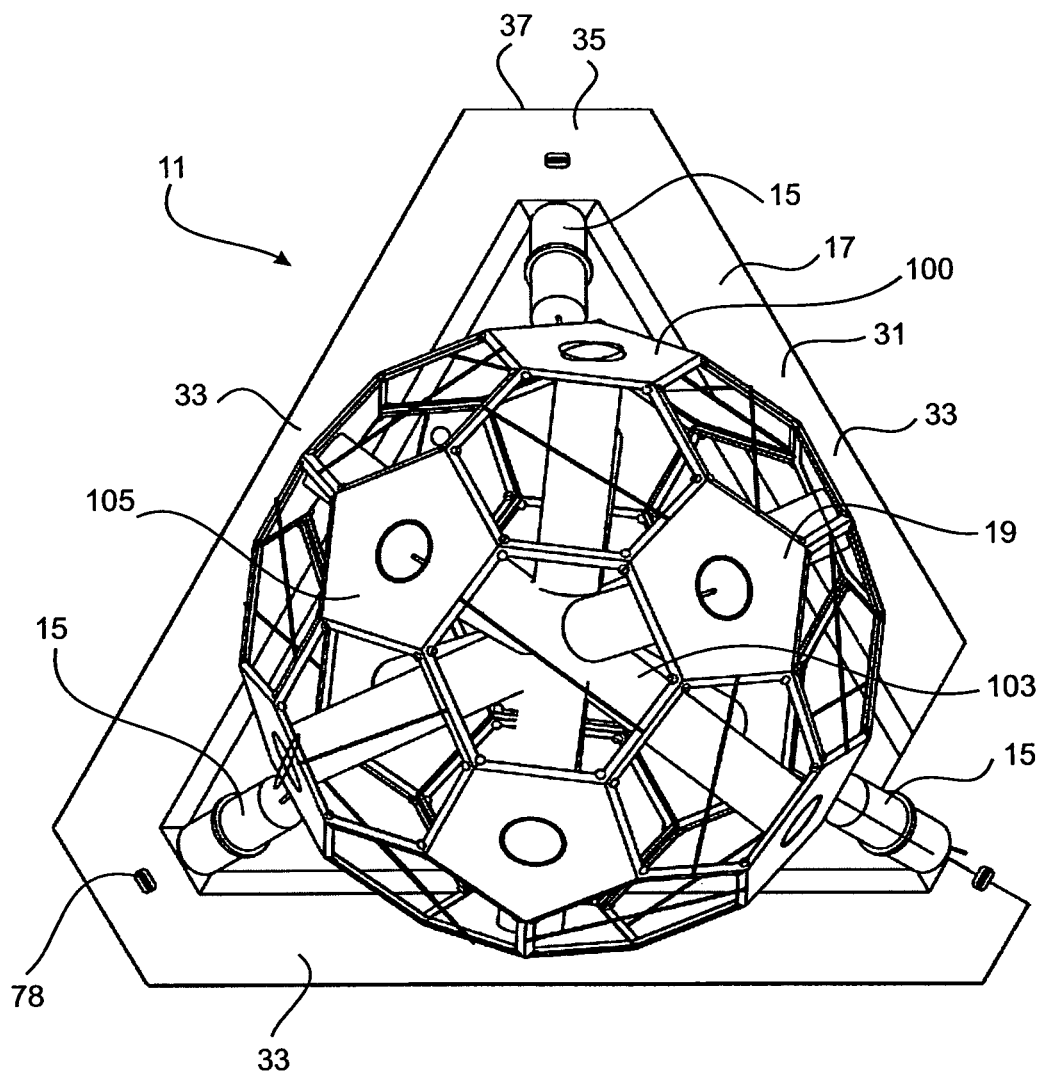
FIG. 4 is a plan view of the arrangement shown in FIG. 3.

The buoyant actuator 19 is positioned above, and is centrally located with respect to, the three pumps 15, as can be seen in FIG. 4.

The tethers 23 are connected to the buoyant actuator 19 at a point where, if the tethers were to extend inwardly of the buoyant actuator, they would meet at the centre of the buoyant actuator. In this way, the pumps 15, tethers 23 and the base 17 define a triangular based pyramid with the buoyant actuator 19 located at the apex of that pyramid.

With this arrangement, the pumps 15 as well as the tethers 23 are at an angle to the horizontal. By providing the pumps 15 at an angle to the horizontal, the motion of the buoyant actuator 19 is able to provide a reciprocating stroke length in the pumps 15 that generates sufficient high pressure water while being located within regions of limited seawater depth; for example, depths of 7 meters to 10 meters. Further, with such a configuration the pumps 15 are able to exploit horizontal wave motions.

Typically, the tethers 23 subtend an angle of approximately 40 degrees to the horizontal, although each can be at a suitable angle, typically between about 35 degrees and 55 degrees.

The base 17 comprises an equilateral triangle having side lengths of approximately 7 meters, corresponding approximately to the depth of the water in which the apparatus is submerged. The edge 37 of each corner 35 of the base 17 is approximately 2 meters.

Figure 3:
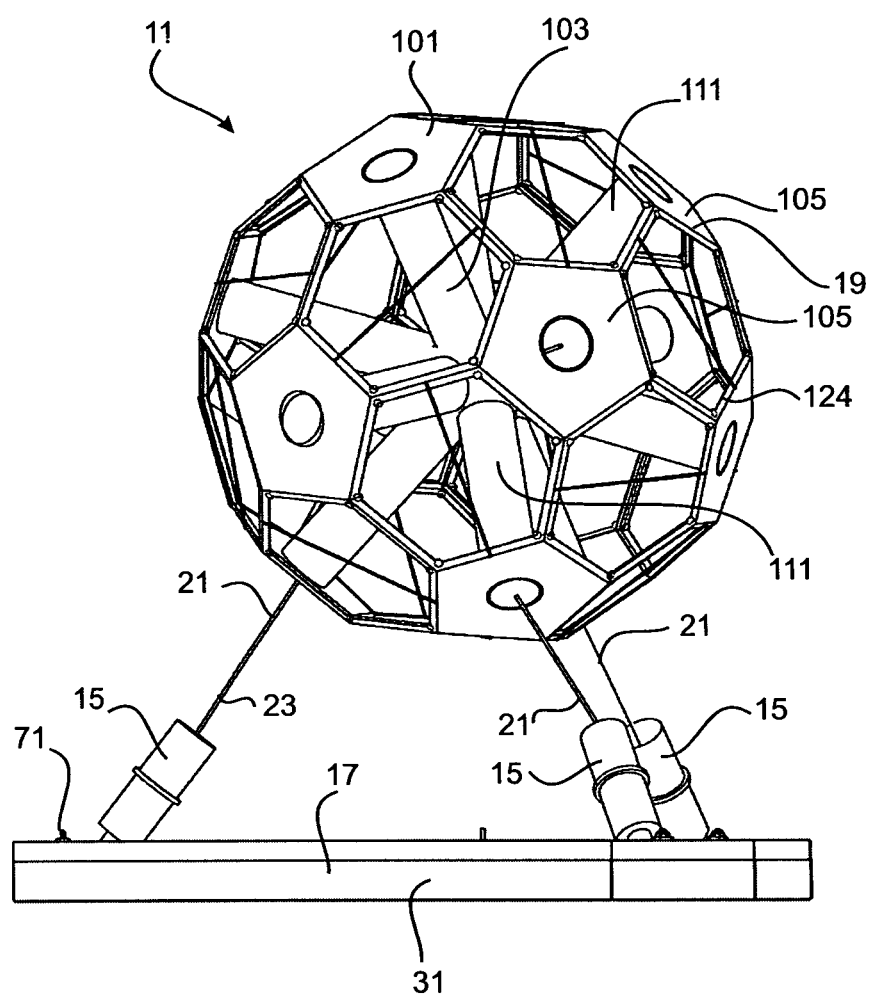
FIG. 3 is a schematic side elevational view of the apparatus, with parts of the buoyant actuator according to the embodiment removed to reveal further details.

The base 17 is made of reinforced concrete and includes an internal system of pipe work 41 that couples the pumps 15 to closed loop systems, as shown in FIG. 3 and as will be described in more detail later. In this embodiment, the pipe work 41 comprises mild steel pipe.

Figure 5:
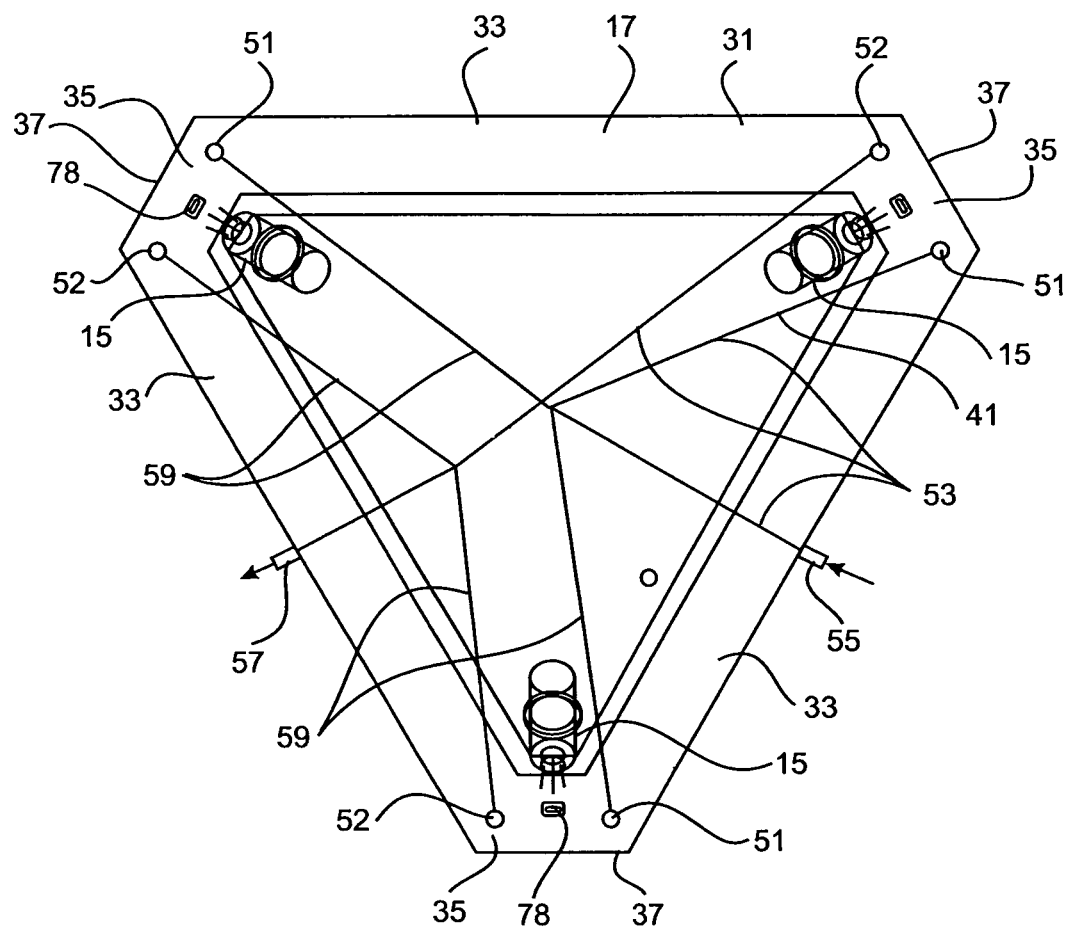
FIG. 5 is a plan view of a lower portion of the apparatus, comprising a base structure and reciprocating pumps mounted thereon.

At each corner 37 of the triangular base structure 31 there is provided first and second ports 51, 52, as best seen in FIG. 5.

Each of the first ports 51 communicates with a low pressure inlet 55 at the outside of the base 17 by way of low pressure piping 53 incorporated within the base 17 as part of the pipe work 41. Each of the second ports 52 communicates with a high pressure outlet 57 by way of high pressure piping 59 incorporated within the base 17 as part of the pipe work 41. A flexible inlet hose 61 connects each first port 51 to the inlet 27 of the respective pump 15, and a flexible outlet hose 63 connects each second port 52 to the outlet 29 of the respective pump 15. In this way, low pressure water is fed from a low pressure manifold 64 that carries low pressure water from elsewhere, into the piping 53 via the inlet 55. From the inlet 55 the water flows to the first ports 51 via the low pressure piping 53, through the flexible hoses 61 to the inlets 27 of the pumps 15. Water delivered under high pressure from the outlets 29 of the pumps 15 flows through the flexible hoses 63 to the second ports 52 and into the high pressure piping 59 from where it is delivered to the high pressure outlet 57. From the outlet 57 the high pressure water flows into the high pressure manifold 66, and from where the high pressure water is taken to its destination.

The base 17 has an external raised portion 71 around its edge which defines a horizontal surface 72, an inclined surface 73 and an interior recess 75. The inclined surface 73 serves to provide a section to which the respective pump 15 can be secured by a connection 77. The inclined surface 73 subtends an angle of 45 degrees to the horizontal.

The base 17 can also be provided with a lifting eye 78 at each corner which enables the base to be installed onto, and lifted from, the seabed as required. The lifting eye 78 is provided on the horizontal surface 72 of the raised portion 71.

Figure 6:
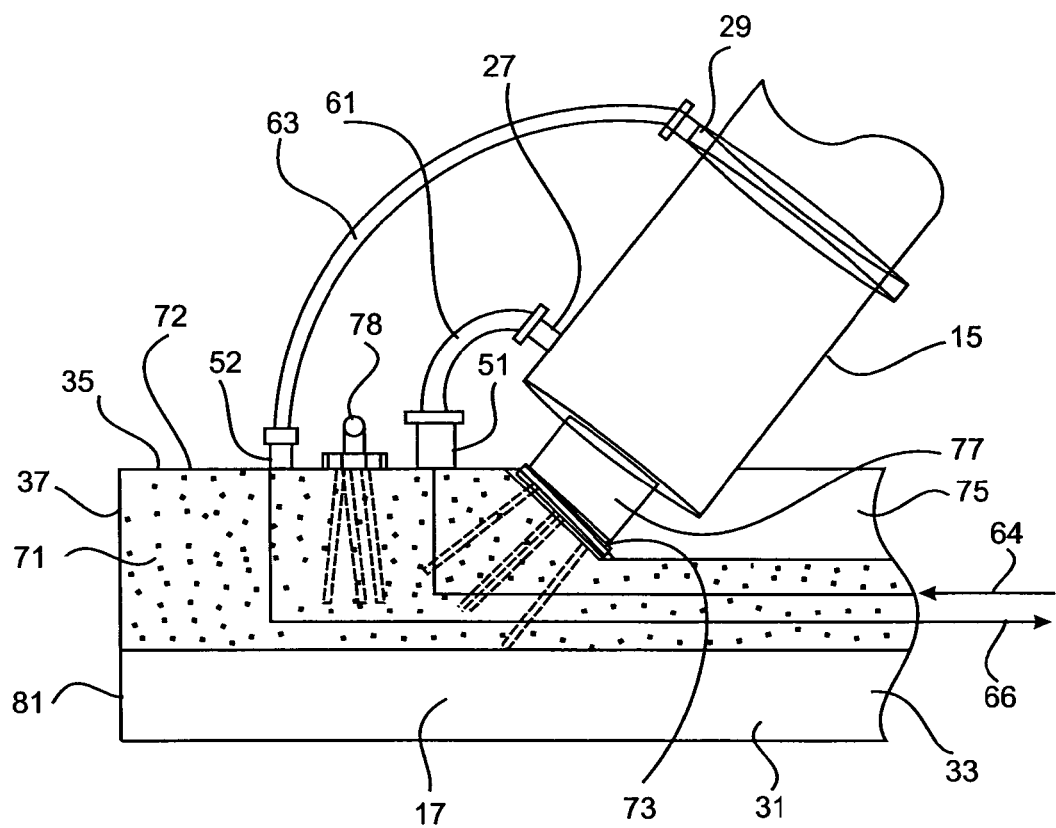
FIG. 6 is a fragmentary sectional elevational view of part of the lower portion shown in FIG. 5.

The base 17 is configured to function as a suction anchor for attachment to the seabed 14. In this regard, the base 17 includes a depending flange 81 (as best seen in FIG. 6) around its edge to provide anchorage for the base using suction when placed on the seabed 14. The base 17 incorporates a suction hole (not shown) to provide a means of expelling trapped fluid as the base is deployed on the seabed. The suction hole is then sealed to maintain the suction anchorage.

The buoyant actuator 19 functions as a submerged float to translate wave action into a reciprocating action at the pumps 15. The buoyant actuator 19 comprises a body 20 which is generally spherical in shape but comprises a plurality of facets 101 that are tessellated. The facets 101 define an outer shell 102 which presents an outer surface. The interior of the buoyant actuator 19 is substantially hollow but comprises an internal support structure 103 which is buoyant, as will be explained later. Some of the facets 101 have been omitted in FIGS. 1, 3 and 4 to reveal part of the internal support structure 103.

Figure 7:
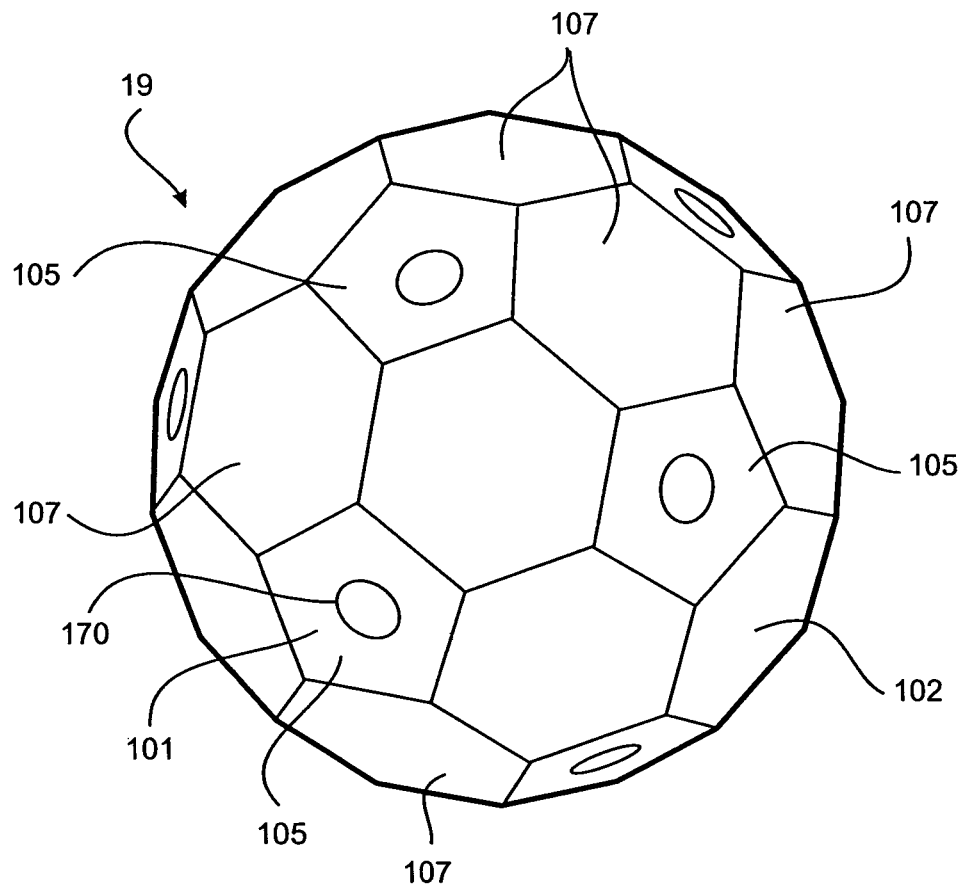
FIG. 7 is an elevational view of the buoyant actuator according to the embodiment.

In the arrangement shown, the outer skin 102 of the buoyant actuator 19 has thirty-six facets 101, comprising twelve pentagonal facets 105 and twenty-four hexagonal facets 107. The facets 101 are tessellated to create the generally spherical shape (somewhat similar to that of a soccer ball), as shown in FIG. 7.

Figure 8:
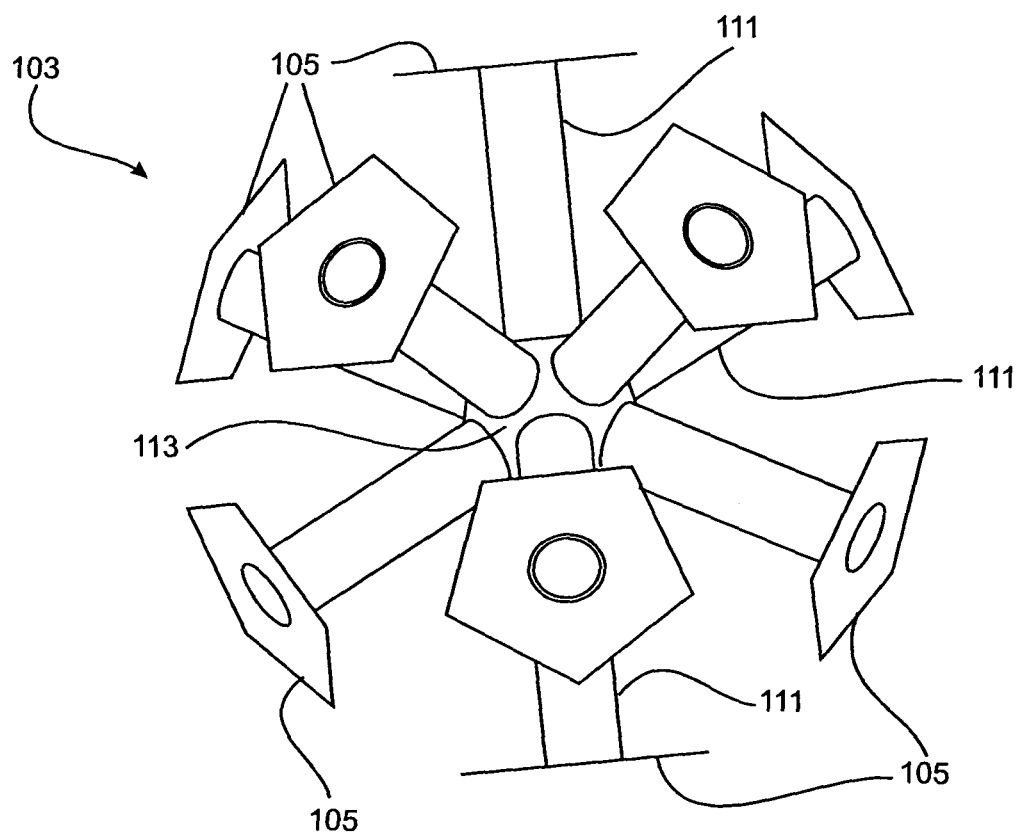
FIG. 8 is a schematic perspective view of an internal support structure incorporated within the buoyant actuator.
Figure 9:
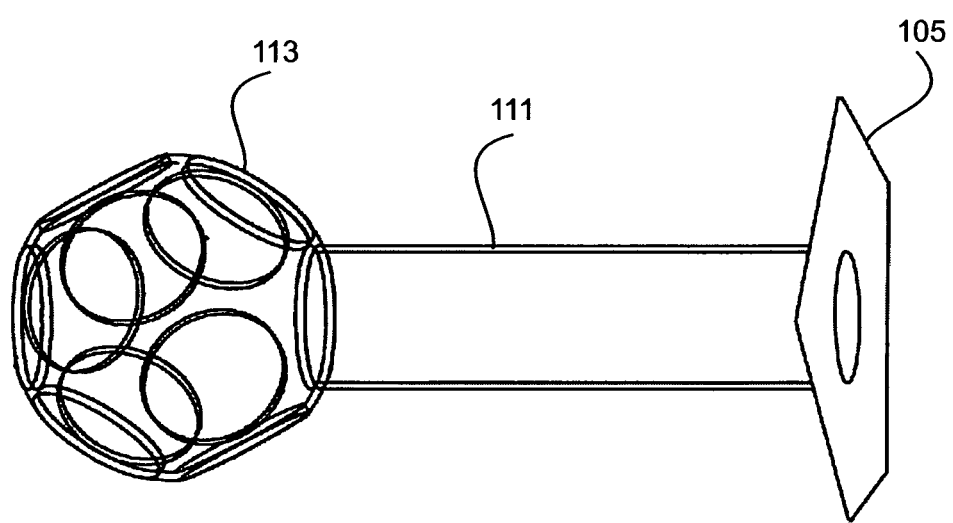
FIG. 9 is a perspective view of part of the internal support structure shown in FIG. 8.

The support structure 103 comprises a plurality of struts 111 that extend radially outwardly from a central core 113. In the arrangement shown there are twelve struts 111, one corresponding to each pentagonal facet 105, as shown in FIG. 8 which is a perspective view of the struts 111 and pentagonal facets 105, but with the hexagonal facets removed for clarity.

Each strut 111 is connected at the inner end to the centrally-located core 113 such that the struts extend radially outward from the core and are substantially radially equidistantly spaced. The core 113 comprises a central inner core of a rigid material such as steel, an intermediate foam layer surrounding the inner core and an outer layer of high density polyethylene (HDPE).

Each distal end of the strut 111 is splayed to present a flat outer face 115 which defines one of the pentagonal-shaped facets 105. The pentagonal-shaped facets 105 are thus supported by the struts 111, and the hexagonal-shaped facets 107 are located in between and fixed to adjacent facets as illustrated in FIG. 7 FIGS. 10, 11 and 12 further illustrate the core 113 of one of the struts 111. For clarity, only half of each facet 101 and the strut 111 is shown.

Figure 10:
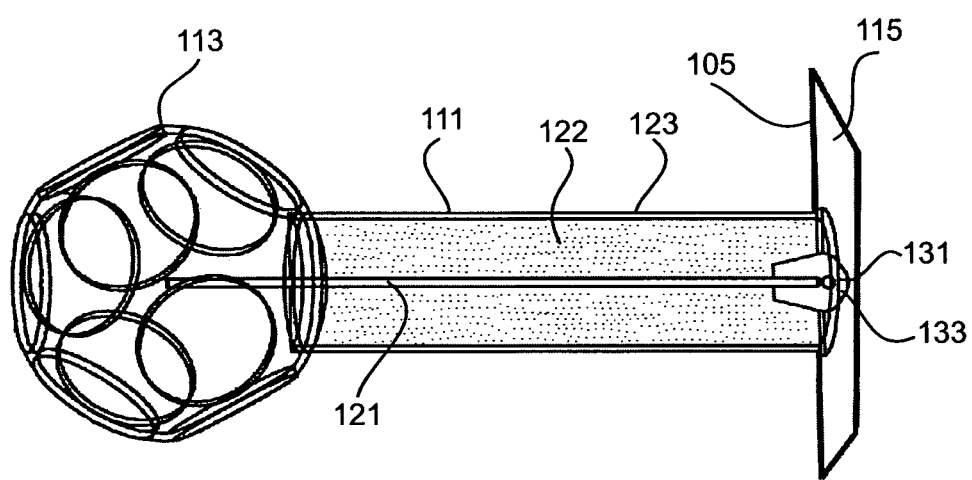
FIG. 10 is a partly sectioned elevation of the part of the structure shown in FIG. 8.
Figure 11:
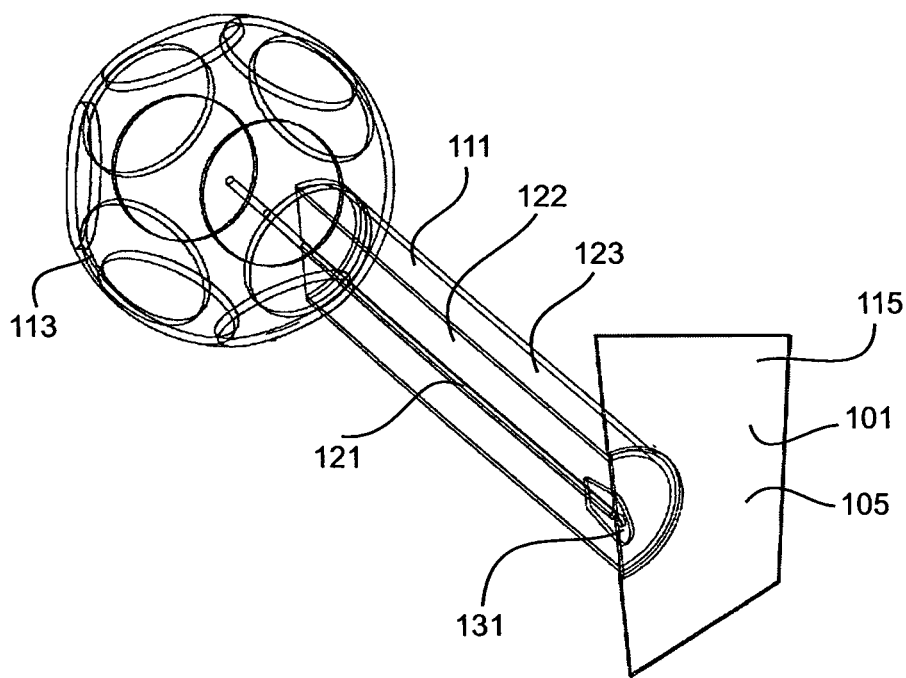
FIG. 11 is a partly sectioned perspective view of the part shown in FIG. 8.
Figure 12:
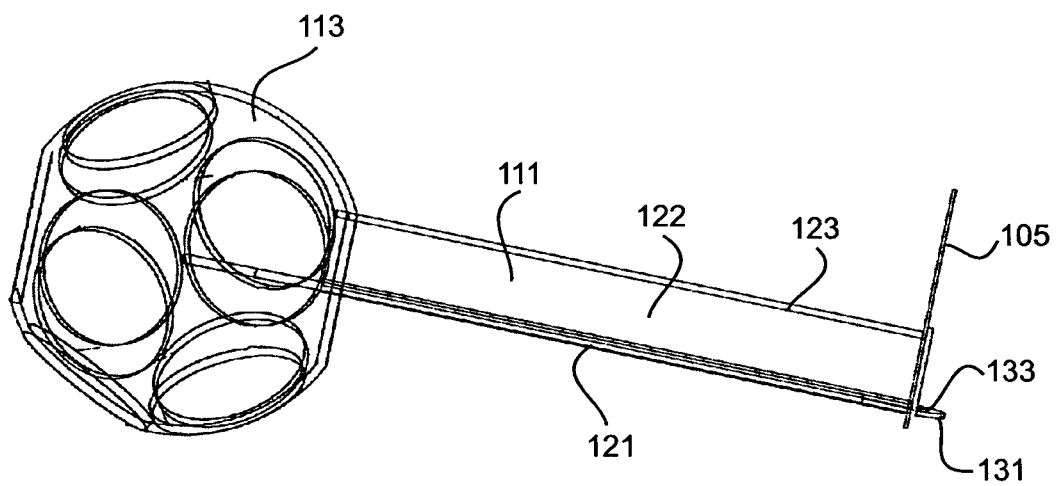
FIG. 12 is a side view of the partly sectioned part shown in FIG. 11.

Each strut 111 is substantially circular in cross-section and comprises three concentric sections; being an inner steel core 121, surrounded by a foam layer 122 and an outer layer 123 of high density polyethylene (HDPE). FIG. 10 is a longitudinal cross-section of the strut illustrating the different layers of the strut.

The outer layer 123 of HDPE extends along the whole of the strut 111 and also provides the outer face 115 which defines the pentagonal facet 105. The facet 105 is thus made from HDPE.

The facets 101 have edges configured as lips 124. The facets 101 are joined together at adjacent edges by connections 125 extending between the lips 124. In the arrangement shown, the connections 125 comprise bolts extending through holes 129 in the adjacent edges of the facets 101 to secure the facets together.

The buoyancy is provided by the foam in each of the struts 111 and the core 113. The foam is used to provide additional uplift during the pumping stroke. A wave exerts almost as much upwards force as it does downwards force on the buoyant actuator 19. As each pump 15 only acts in one direction the buoyancy inside the buoyant actuator 19 acts as a potential energy storage during the down stroke so that the buoyancy and uplift force both work on the pump during the upwards stroke direction.

The foam may be a closed cell poured urethane foam, although other suitable materials could be used.

Due to the substantially hollow nature of the buoyant actuator 19, it is lightweight compared to prior art floats.

In the arrangement shown, each strut 111 weights of the order of less than 35 kg, with the whole float structure weighing the order of 400 kg. Further, the diameter of the buoyant actuator 19 is of the order of 4 m to 7 m, depending upon the depth of water in which it is to be used.

As mentioned earlier the buoyant actuator is connected to each pump 15 by tether 23. A coupling in the form of a pad eye 131 is used to connect the tether 23 to the buoyant actuator 19. The pad eye 131 is attached to the inner steel core 121 as can be seen in FIG. 10 and extends from the facet 105. The pad eye 131 includes an HDPE coating 133 for water resistance.

The buoyant actuator 19 incorporates a storm release feature to maintain the integrity of the buoyant actuator when exposed to an aggressive sea state in adverse weather conditions.

Figure 13:
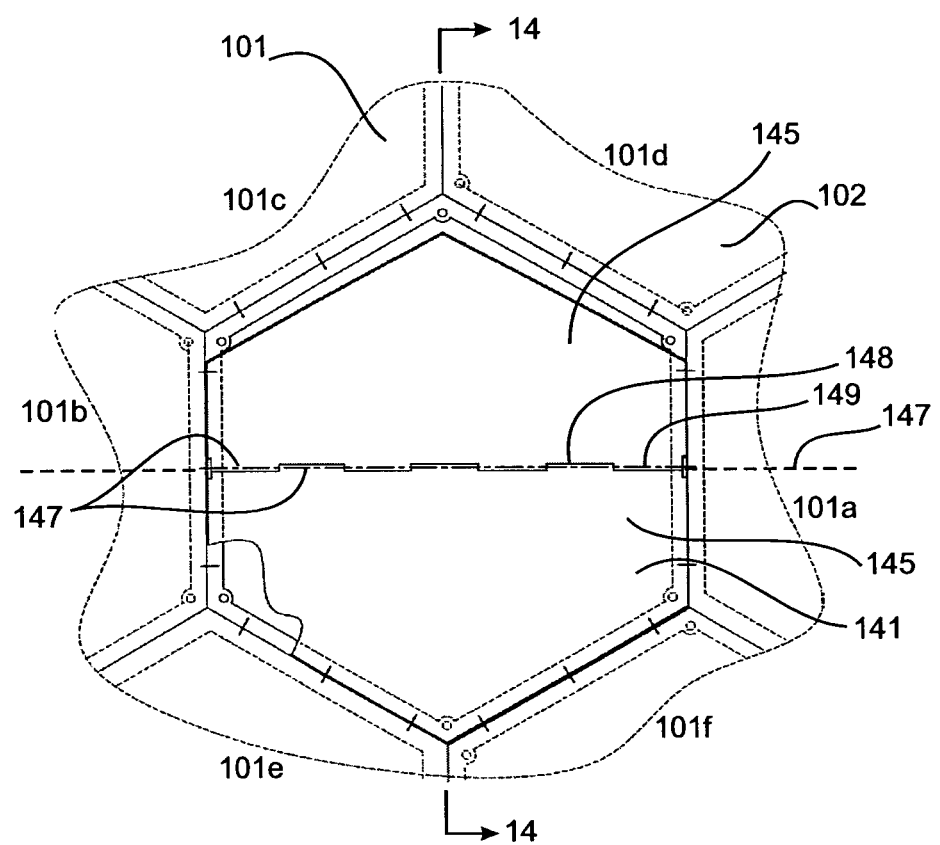
FIG. 13 is a fragmentary view of the buoyant actuator, showing in particular a mechanism for reducing the buoyancy thereof in certain conditions.
Figure 14:
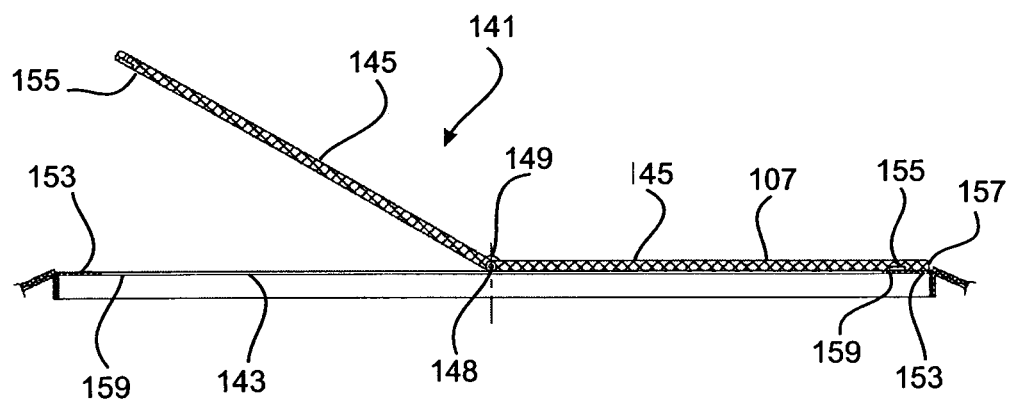
FIG. 14 is a cross-sectional view of the arrangement shown in FIG. 13.

For this purpose, means 141 are provided for opening the interior of the buoyant actuator 19 to permit water to flow through the buoyant actuator in response to exposure of the buoyant actuator to such adverse weather conditions. This is achieved by establishing openings 143 in the shell 102 in response to the adverse weather conditions imposed upon the buoyant actuator 19. Specifically, a number of the hexagonal facets 107 of the buoyant actuator 19 are each designed as a pair of hinged flaps 145. This is illustrated schematically in FIG. 13 which is a plan view of one of these hexagonal facets 107. FIG. 14 is a cross section along the line 14-14 of FIG. 13.

Each of these hexagonal facets 107 comprises the pair of two identical semi-hexagonal flaps 145 that are hingedly connected along a major axis 147 of the facet by a hinge 148. The hinge 148 comprises a hinge shaft 149 extending between adjacent facets 101a, 101b, with the flaps 145 being hingedly mounted on the shaft. The two flaps 145 have interspaced lugs 147 with bores therein through which the hinge shaft 149 extends to enable the flaps 145 to be mounted so that the adjacent edges thereof are closely aligned.

Each semi-hexagonal flap 145 is pivotally movable between a closed condition which it normally occupies and which is in the plane of the facet 107, and an open condition in which it swings away from the plane of the facet to establish an opening 143 in the outer shell 102. Each flap 145 is biased towards its closed condition and is adapted to swing away to establish the opening 143 in response to a predetermined fluid pressure differential imposed thereon between the hollow interior and the surrounding body of water in which the buoyant actuator 19 is immersed. Typically, the predetermined fluid pressure differential arises from heaving motion imparted to the buoyant actuator when it is subjected to an aggressive sea state. Biasing of the flap 145 towards the closed condition may be achieved by use of a spring mechanism to apply a spring force to assist in closing of the flap. The spring mechanism may be incorporated in the hinge 148. The spring force needs to be relatively weak in the sense that it will facilitate closure only after the sea conditions have subsided and the flap is just luffing. However, it may not be necessary to have provision for spring loading on the flaps as the flaps may self-close merely with the gentle motion of the buoyant actuator 19.

In the arrangement illustrated, the flaps 145 are adapted to swing outwardly away from the facets 107 to establish the openings 143. In another arrangement, which is not illustrated, the flaps may be adapted to swing inwardly into the hollow interior of the body 20. In yet another arrangement, which also is not illustrated, some flaps may be adapted to swing outwardly while other flaps are adapted to swing inwardly.

The flaps 145 thus provide closures for the openings 143 to block or at least inhibit fluid flow therethrough.

A releasable coupling 153 is provided for releasably maintaining each flap 145 in the closed condition. The releasable coupling 153 is adapted to actuate to release the flap 145 to allow it to move from the closed condition to the open condition to establish the opening 143 in response to the adverse weather conditions. In the illustrated arrangement, the releasable coupling 153 comprises a magnetic coupling utilising a magnetic attractive force to maintain the respective flap in the closed condition. Specifically, the magnetic coupling comprises a plurality of magnets 155 provided at locations along the free edge 157 of the flap 145 and at corresponding location along the adjacent edges of adjacent facets 101c, 101d, 101e, and 101f. Each magnet 155 is selected to require a force equivalent to a weight of about 50 kg to release it. Steel strips 159 are provided on the edges of adjacent facets to which the magnets 155 are attracted to provide the closing. In this way, the flaps 145 will remain in closed conditions defining a hexagonal facet until the force against them is sufficient to overcome the magnetic attraction, thus forcing the flaps to release and open up. The number of magnets 155 is selected depending upon the requirements.

The buoyant actuator 19 does not need to be completely watertight in order to function in the manner described. Indeed in normal operation the hollow interior of the buoyant actuator 19 is filled with water and this entrapped water moves with the buoyant actuator as a contiguous entity even if there is a slight flow past the lips of the flaps.

Water viscously trapped to move with the exterior surface of the buoyant actuator 19 functions to provide added effective mass to the buoyant actuator. Because of the viscosity of the water in which the buoyant actuator 19 is immersed, the buoyant actuator tends to drag the fluid (water) closest to the body 20 as it is moved and this fluid acts like an extension of the body, hence the name "added effective mass". The added effective mass depends on the velocity of the buoyant actuator 19 and its size and shape, but it will be zero when the buoyant actuator is stationary in the fluid. The total mass for calculating the dynamics of the buoyant actuator 19 is then the sum of its actual mass (mass of structure plus mass of water contained therein) plus the added effective mass.

There is a near instantaneous volume reduction (by opening of flaps 145) to reduce the mass of water trapped in the hollow interior of the buoyant actuator 19. Furthermore, the opening of flaps 145 reduces the velocity of the buoyant actuator 19. The reduction in velocity also sheds the external volume of water that is normally dragged around with it, the so-called added effective mass. Thus opening of flaps 145 reduces the trapped volume and the effective mass (which reduces the potential energy) while at the same time also reducing the kinetic energy by reducing the velocity and mass.

The opening of flaps 145 allows water to pass through the structure so that there is minimal resistance to the moving water that impinges on it. This removes much of the potential energy as the buoyant actuator 19 is not being heaved up as much by the waves and it is lighter, and it also reduces the kinetic energy at the same time because the mass is reduced (water is no longer trapped) and the velocity is reduced (because the buoyant actuator is no longer providing such reaction to the wave forces that would cause it to accelerate). It is not possible to make the buoyant actuator 19 appear completely transparent to the water as there will always be some coupling between the two but it is expected that the storm loads on the pumps 15 and couplings 21 can be attenuated to acceptable levels using the flaps 145 so there is not the need to engineer very massive (and expensive) structures to resist these large forces.

Each flap 145 is adapted to move away from the respective facet 107 to establish the opening 143 to permit fluid flow therethrough in response to a predetermined fluid pressure differential imposed thereon between the hollow interior and the surrounding body of water. The predetermined pressure differential required to cause the flap 145 to move away from the facet 107 is dictated by the strength of the magnetic attractive force of the releasable coupling 153 maintaining the flap in the closed condition. Typically, the pressure differential arises as a consequence of fluid inertia which causes a force to be exerted on one side of the flap 145 when the buoyant actuator 19 undergoes a heaving motion.

It is a further feature that the buoyant actuator 19 is fault tolerant to flap failure. If one flap 145 were to fail open in normal operation (due for example, to a failure in the magnetic latch, or a broken hinge) there would still not be a flow passage established for water to enter and then leave the hollow interior of the buoyant actuator 19 to an extent which would adversely affect its operation. For there to be flow that might adversely affect operation of the buoyant actuator 19 there would need to be at least two flaps open, and the probability of two flaps failing open is considerably less than the probability of just one flap failing.

Referring now to FIGS. 15 to 25, each pump 15 comprises an elongated body 171 of tubular construction having interior 172. In this embodiment, the elongated body 171 is of circular cross-section. The elongated body 171 has an exterior side-wall 173 which in this embodiment is formed as an upper side wall section 175, and intermediate side wall section 176 and a lower side wall section 177 connected together.

The pump body 171 has an upper end which is closed by a top wall 181 and a lower end which is closed by a lower wall 183. The lower wall 183 is configured for attachment of the base 17 by means of the connection 77.

The interior 172 comprises an upper potion 178 defined within the upper side wall section 175 and a lower portion 179 defined within the intermediate side wall section 176 together with the lower side wall section 177.

An intake chamber 185 and a discharge chamber 187 reside within lower portion 179 of the interior 172 of the body 171. The intake chamber 185 is defined between the lower wall 183 and a lower internal portion 191 within the interior 172. The discharge chamber 187 is defined between the lower internal portion 191 and an upper internal portion 193 which incorporates a cylindrical interior side wall portion 195 and an end wall portion 197 in opposed relation to and spaced from the lower internal portion 191. The interior side wall portion 195 is spaced inwardly from the exterior side wall 173 of the body 171 such that an annular space 198 is defined therebetween.

A piston mechanism 201 is accommodated in the lower section 179 of the interior 172 and extends between the intake chamber 185 and the discharge chamber 187. The piston mechanism 201 is of hollow construction and incorporates a transfer passage 203 having one end 205 thereof communicating with the intake chamber 185 and, the other end 207 thereof communicating with the discharge chamber 187.

The piston mechanism 201 comprises a piston base 209 and a piston tube 211 extending upwardly from the base 209. The piston tube 211 passes through an opening 213 in the lower portion 191 to extend between the intake chamber 185 and the discharge chamber 187. A seal 215 provides a fluid seal around the piston tube 211 between the intake chamber 185 and the discharge chamber 189.

The lower internal portion 191 and the upper internal portion 193 are clamped within a bolted flanged coupling 213 between the intermediate and lower wall sections 176, 177 of the body 171.

The transfer passage 203 provides a chamber 219 within the piston 201. An intake check valve 221 is provided in the base 209 of the piston below the piston chamber to allow flow into the piston chamber 219 upon a downstroke of the piston 201 while preventing flow in the reverse direction upon upstroke of the piston.

The discharge chamber 187 and the piston chamber 219 cooperate to define a pumping chamber 223

The pump 15 has an inlet potion 225 which defines the pump inlet 27 and which opens onto the intake chamber 185.

The pump 15 has an outlet potion 227 which defines the pump outlet 29 and which opens onto the discharge chamber 187 at discharge port 229. The outlet portion 227 incorporates a check valve arranged to allow flow under pressure outwardly from the discharge chamber 187 while preventing return flow.

The pumping chamber 223 undergoes expansion and contraction in response to reciprocatory movement of the piston mechanism 201. The reciprocatory motion of the piston mechanism 201 comprises an upstroke (corresponding to volume contraction of the pumping chamber 223) and a downstroke (corresponding to volume expansion of the pumping chamber 223). In this way, the pump 15 performs a pumping stroke upon upward movement of the piston mechanism 201 and an intake stroke upon downward movement of the piston 201.

The piston mechanism 201 further comprises a lifting mechanism 241 adapted to operably couple the piston mechanism 201 to the tether 23.

The lifting mechanism 241 comprises a lifting head 243 and a plurality of lifting arms 245 extending outwardly from the lifting head 243 to the piston base 209. The lifting arms 245 extend through the annular space 198 and also through openings 247 in the two internal portions 191, 193. The openings 247 are configured to guide movement of the lifting arms 245 and may incorporate bushes 248. The bushes 248 are advantageously formed of a material exhibiting low friction material when in seawater, one example of such material being Vesconite™.

The tether 23 is connected to the lifting mechanism 241 through a gearing means 251 accommodated in the upper portion 176 of the pump interior 172. The purpose of the gearing means 251 is to translate the reciprocating motion of the buoyant actuator 19, and hence the reciprocating motion of the tether 23, into a shorter pumping stroke length at the piston. This can be useful as smaller stroke lengths (which correspond to smaller stroke velocities) are advantageous for achieving reliable high pressure sealing (along with larger piston diameters).

The top wall 181 of the pump body 171 incorporates an aperture 253 through which the lower portion 23a of the tether 23 extends via a sheath 255 which is attached to a fitting 257 on the top wall 181 by a sheath seal 258. The purpose of the sheath 255 is to protect the tether 23 from foreign matter (such as scale and marine crustacea) which might otherwise accumulate on it. This avoids the potential for accumulated foreign matter entering the pump to foul its workings.

The lower portion 23a of the tether 23 comprises a section of rope 259 which is utilised as part of the gearing means 251, as will become apparent.

The gearing means 251 is configured as a pulley mechanism 261 comprising an axle assembly 263 having a rotational axis transverse to the direction of reciprocation of the tether 23 and also transverse to the direction of reciprocation of the pump piston 201. The axle assembly 263 comprise a first axle section 265 and two second axle sections 267 disposed one to each side of the first axle section. The first axle section 265 is of a larger diameter than the two second axle sections 267. The two second axle sections 267 each has the same diameter as the other.

The rope section 259 is connected to, and winds about, the first section 265 of the axle assembly. The lifting assembly 241 is coupled to the axle assembly 263 by two ropes 269, each of which is connected to, and winds about, one of the two second sections 267 of the axle assembly 263.

Figure 15:
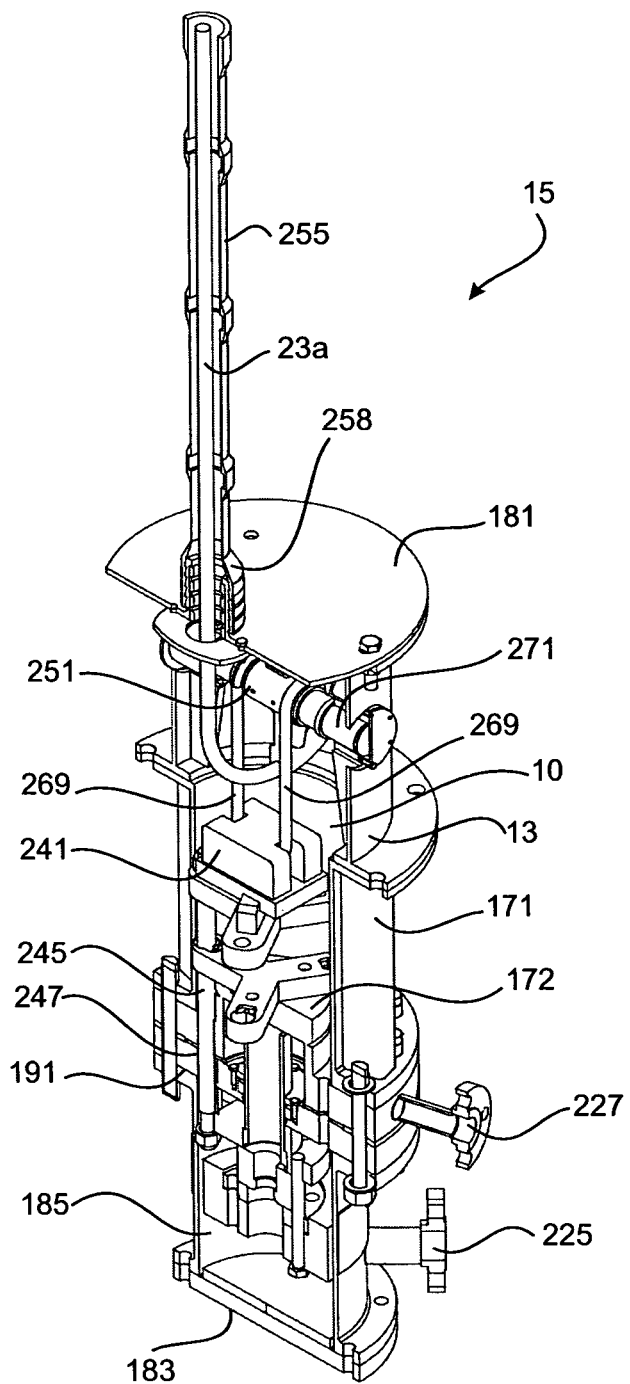
FIG. 15 is a sectional perspective view of a reciprocating pump forming part of the apparatus.
Figure 16:
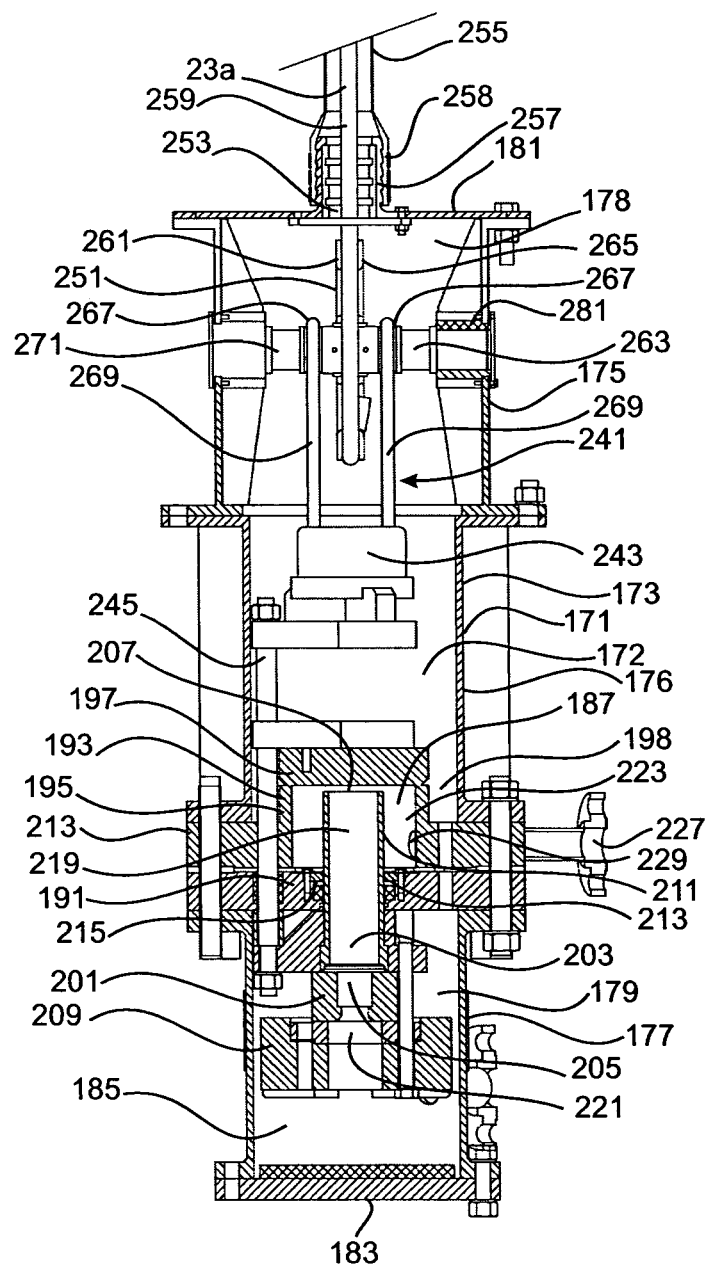
FIG. 16 is a sectional elevational view of the reciprocating pump.
Figure 17:
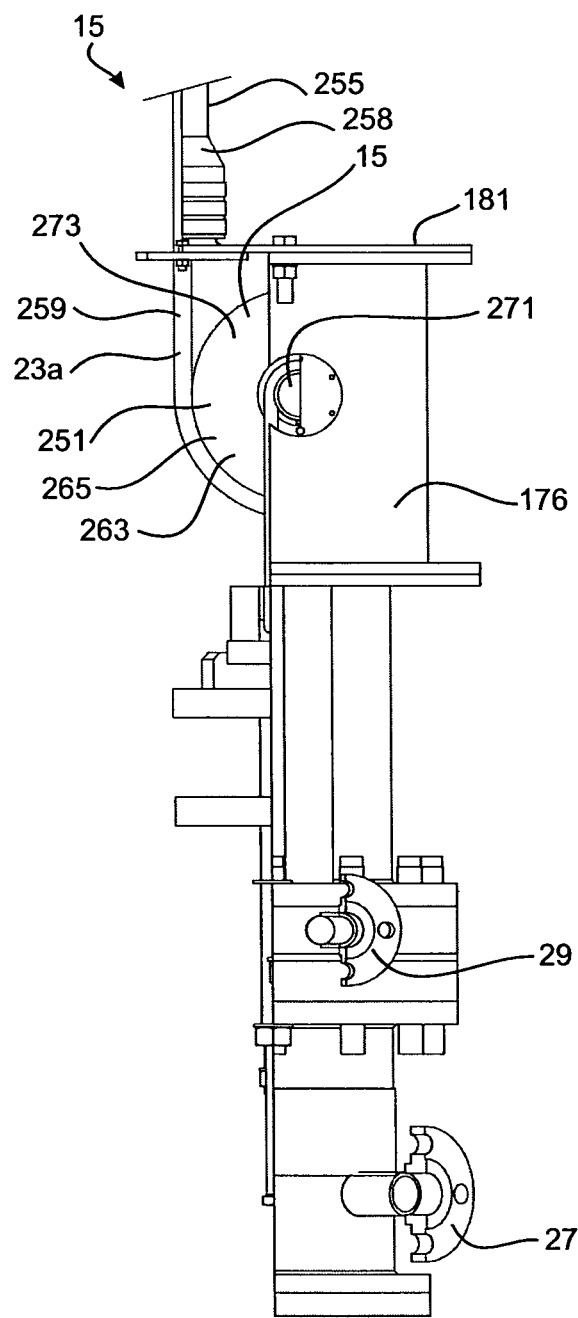
FIG. 17 is an elevational view of the pump in part section to reveal some internal details.
Figure 20:
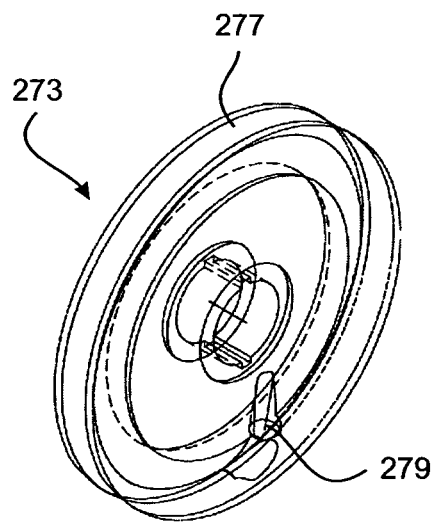
FIG. 20 is a perspective view of a wheel adapted to be mounted on the shaft shown in FIG. 17.
Figure 21:
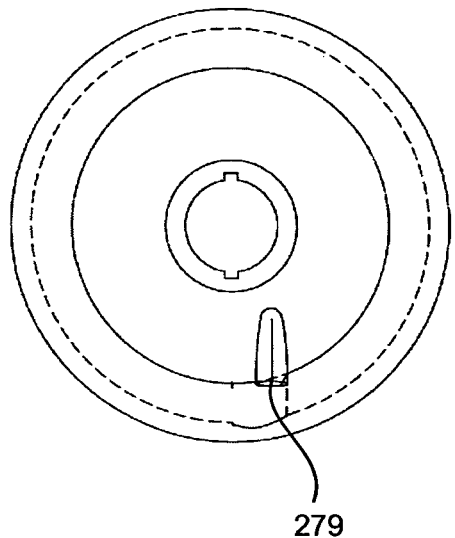
FIG. 21 is a side elevational view of the wheel.
Figure 22:
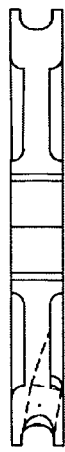
FIG. 22 is a cross-sectional view of the wheel.
Figure 23:
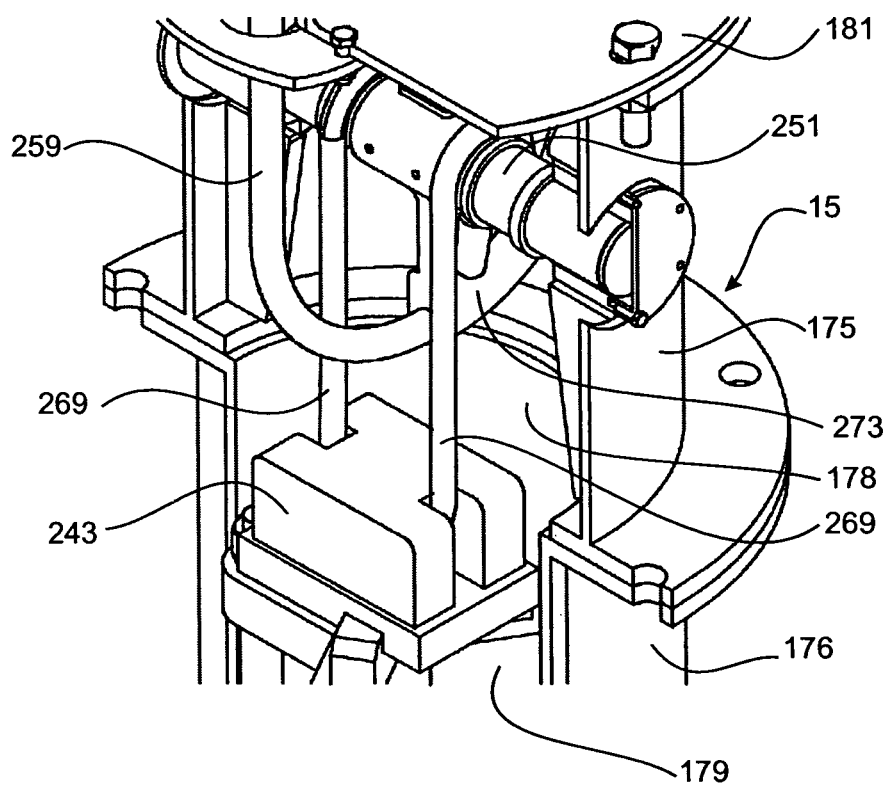
FIG. 23 is a fragmentary perspective view of a section of the pump.
Figure 24:
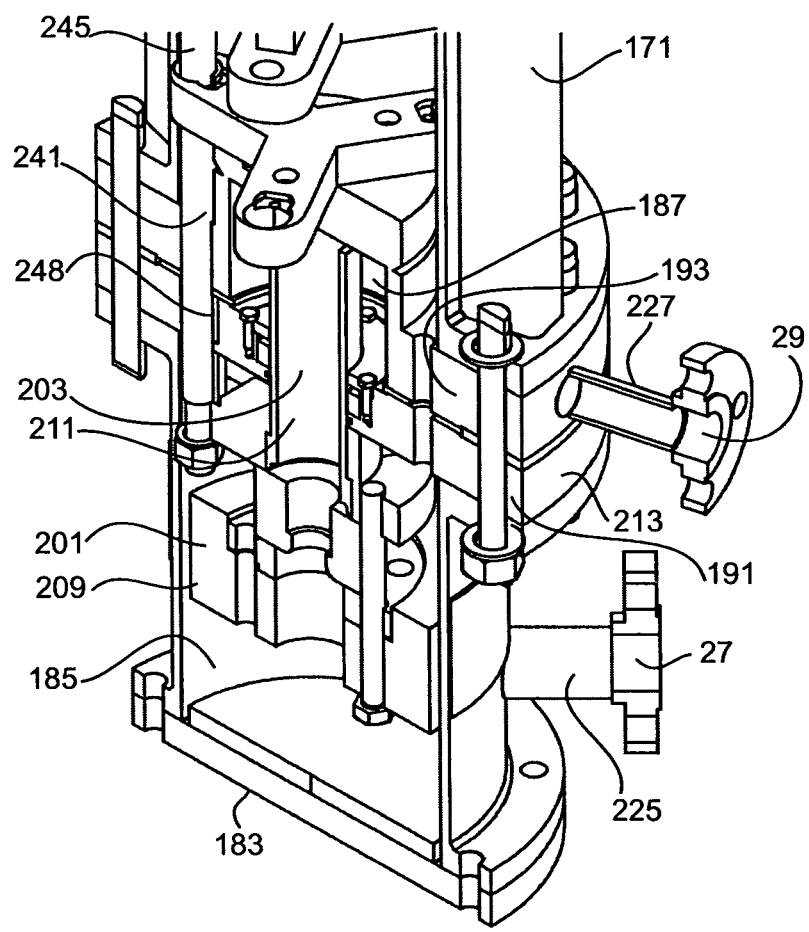
FIG. 24 is a fragmentary perspective view of a lower end section of the pump.
Figure 25:
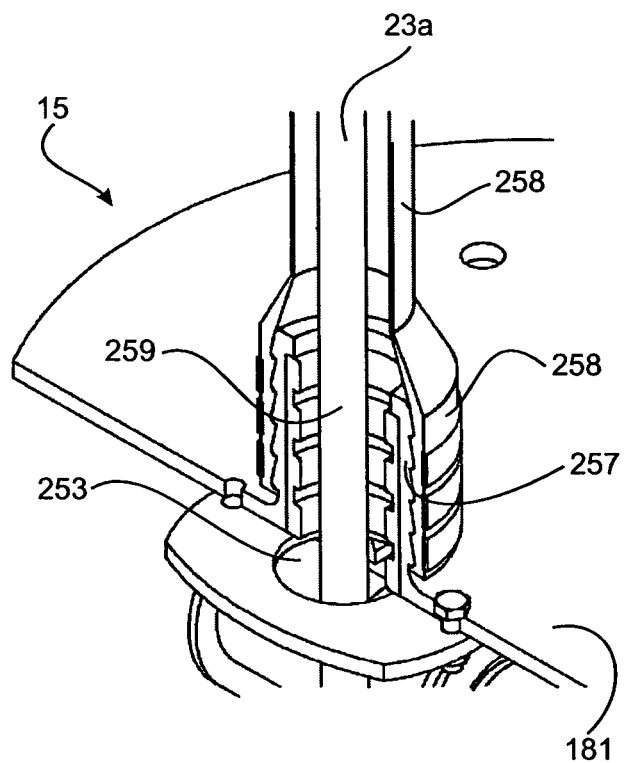
FIG. 25 is a fragmentary perspective view of an upper end section of the pump.

In the arrangement shown, the axle assembly 263 comprises a shaft 271. A wheel 273 is mounted on the shaft 271 to provide the first axle section 265 and two circumferential grooves 275 are formed in the shaft 271 to provide the second axle sections 267. The wheel 273 is fixed to the shaft 271 for rotation therewith. The wheel 273 incorporates a circumferential groove 277 at its rim in which the rope section 259 can run. The wheel 273 has an attachment hole 279 for attachment of the end of the rope section 259 to the wheel. As mentioned earlier, the rope section 259 forms part of the gearing means 251 and will hereinafter be referred to as the wheel rope. The two ropes 269 are secured to the shaft 271 and run within the grooves 275. Each rope 269 is secured at one end to the shaft 271, runs within the respective groove 275 around the circumference of the shaft, extends down to the lifting head 243 and is attached thereto at its other end. The ropes 269 will be hereinafter referred to as the shaft ropes. FIG. 15 shows some detail of the gearing mechanism 251, but with a portion of the wheel 273 removed for clarity.

The shaft 271 is rotatably supported at its ends in bushes 281 accommodated in bearing housings 283 incorporated in the upper side wall section 175 of the pump body 171. The bushes 281 are advantageously formed of a material exhibiting low friction material when in seawater, one example of such material being Vesconite™.

The wheel rope 259 and the two shaft ropes 269 are wound in opposite directions. The points of securement of the respective wheel rope 259 and the two shaft ropes 269 are diametrically opposed. The wheel rope 259 extends through the aperture 253 in the top wall 181 of the pump body and into the bore of a rope sheath 255. The reciprocating motion of the buoyant actuator 19 in response to the wave action causes the wheel rope 259 to move up and down with the wave motion. This causes the wheel 273 to rotate, and with it the shaft 271. This rotation of the shaft 271 causes the shaft ropes 269 to move up and down, thus translating to reciprocating movement of the lifting mechanism 241 and the piston 201 as a whole.

In the arrangement shown, the wheel 273 has a diameter of about five times that of the shaft 271. As an example, the wheel 273 can have a 30 cm diameter and the shaft of 6 cm.

Thus for a displacement of 80 cm of the wheel rope 259 under the influence of wave motion, the shaft ropes 269 will displace only 16 cm. In this way, the wheel 273, shaft 271 and ropes 259, 269 provides a gearing arrangement that allows a larger displacement by the buoyant actuator 19 to be translated into a shorter pumping stroke length of the piston mechanism 201.

The pump 15 is primarily made from steel, although the piston mechanism 201 can be made from other materials such as ceramic materials. The rope sheath 255 may be made from rubber, and the ropes 259, 269 can be made from any suitable material such as composite material, for example nylon and polyethylene. The upper side wall section 175 could also be made of a composite copolymer.

In operation, a wave impinging on the apparatus 10 causes uplift of the buoyant actuator 19. This uplift is transmitted through the tethers 23 to each of the three pumps 15. In each pump 15 this causes the piston mechanism 201 to lift, with the result that the pumping chamber 223 undergoes volume contraction. In this way, the pump 15 performs a pumping stroke, with some of the water confined within the pumping chamber 223 being discharged through the pump outlet 29. Once the wave has passed, the uplift force applied to the buoyant actuator 19 diminishes and the buoyant actuator descends under the weight of the various components connected thereto, including the lifting mechanism 241 and the piston 201. As the piston mechanism 201 descends, it plunges into water which has entered the intake chamber 185. As the piston mechanism 201 descends, water within intake chamber 185 flows into the piston chamber 219 and the progressively expanding pumping chamber 223. The intake check valve 221 allows entry of the water. This charges the piston chamber 219 and the discharge chamber 187 in readiness for the next pumping stroke which is performed upon uplift of the buoyant actuator 19 in response to the next wave disturbance.

It is a feature of this arrangement that that the pump 15 achieves high pressures in the pumping chamber 223 with a larger diameter piston and smaller strokes than was the case in the prior art (un-geared pumps). Both smaller stroke distance (which translates to smaller stroke velocity) and larger piston diameters, are favourable properties for achieving reliable high pressure sealing. Thus the design of a high pressure geared pump leads to more reliable sealing.

Figure 26:
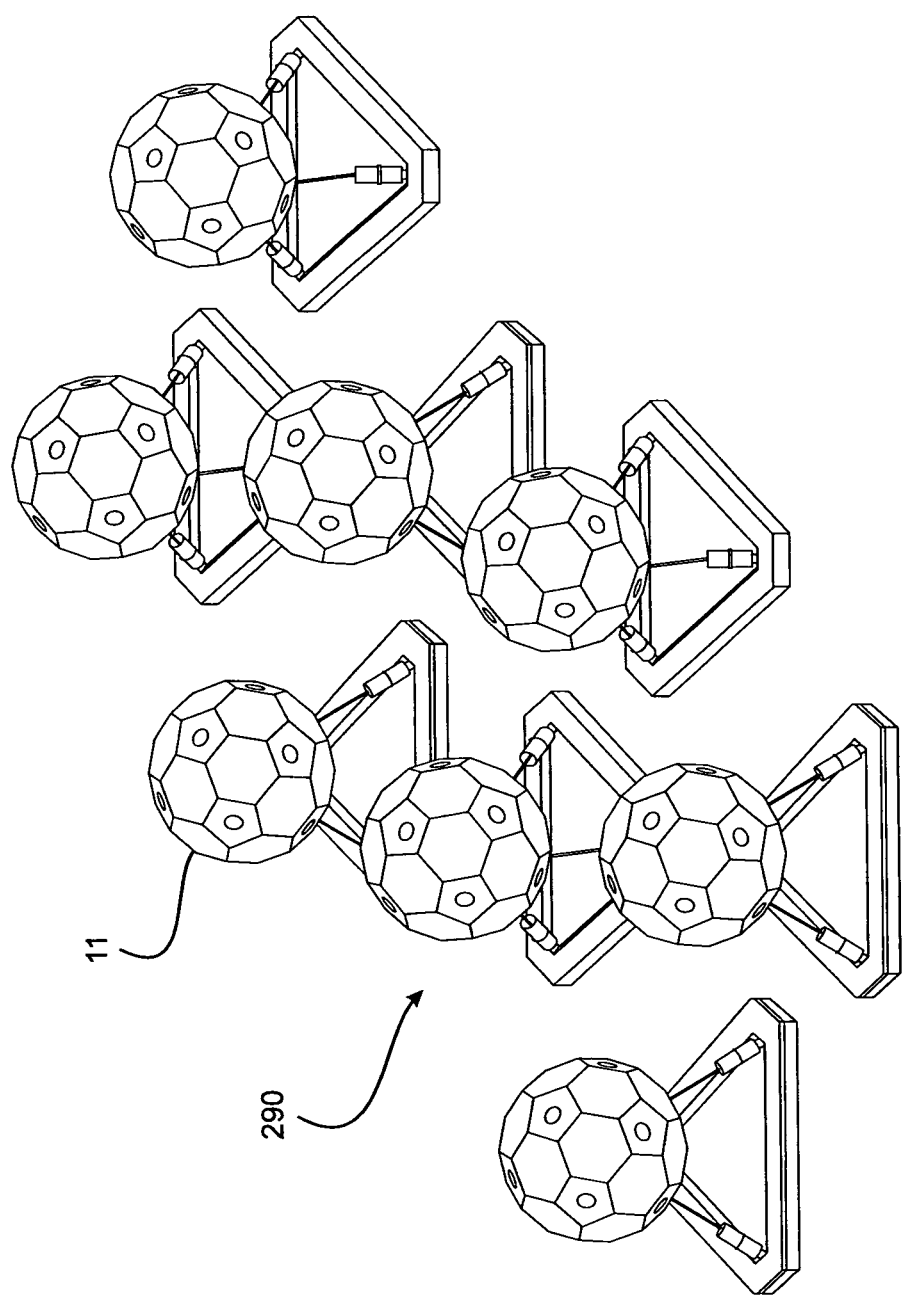
FIG. 26 is a schematic perspective view illustrating a number of the apparatus according to the embodiment positioned in an array.
Figure 27:
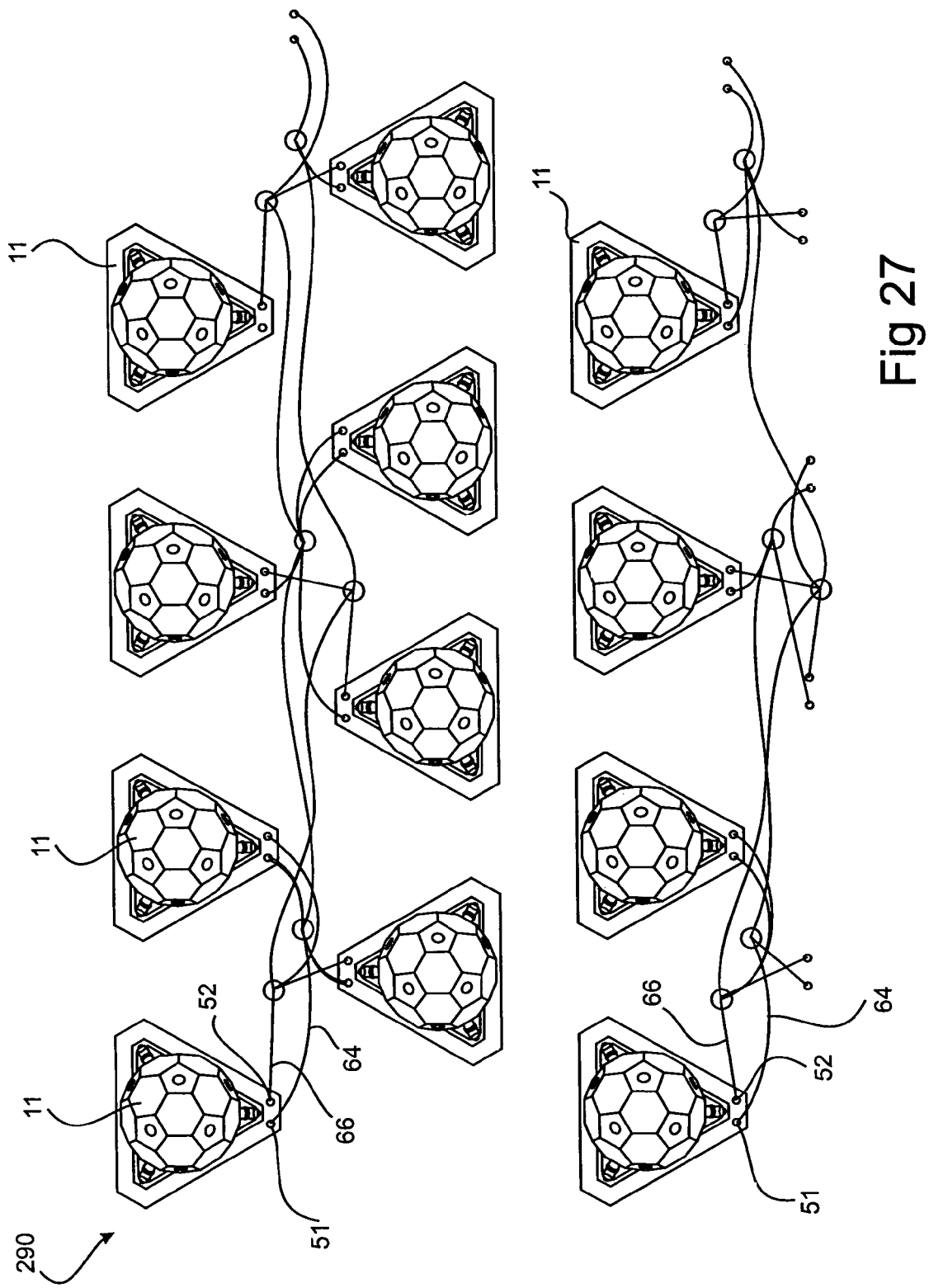
FIG. 27 is a view somewhat similar to FIG. 26 but is showing the apparatus positioned in another array.
Figure 28:
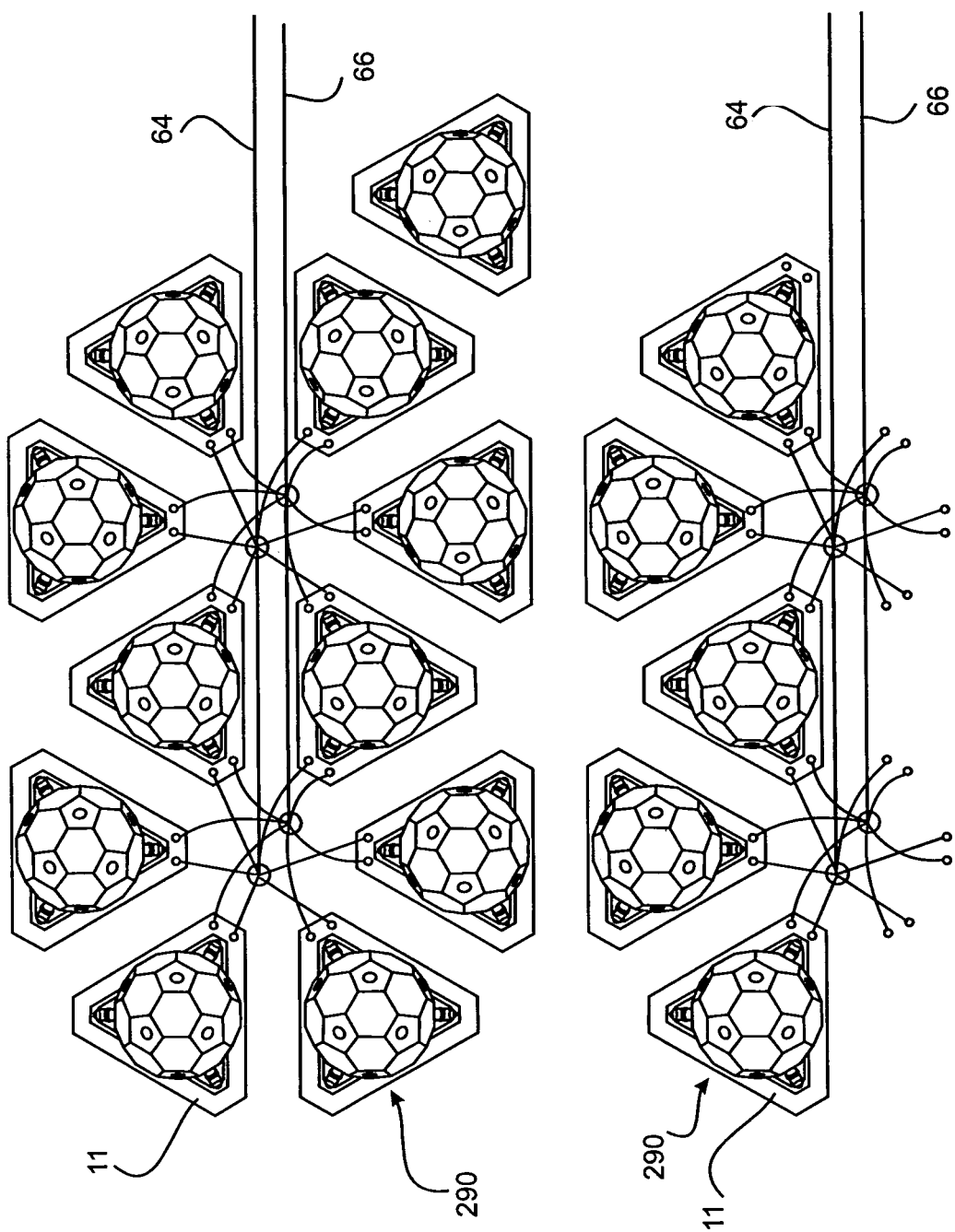
FIG. 28 is also a view similar to FIG. 26 but showing the apparatus in yet another array.

A number of apparatus 11 can be provided in an array 290. Examples of the arrays 290 that can be implemented are shown in FIGS. 26, 27 and 28. In each instance, the low pressure inlets 27 and the high pressure outlet 29 of each of the bases 17 are respectiviely connected to low pressure manifolds 64 and the high pressure manifolds 66.

The spacing between units (being apparatus 11) and the patterning of the arrays are features that are optimised with respect to the actual wavelength of the dominant sea state and the directions of the waves.

The arrangement is optimised for operation in shallow waters of about 10 m depth or less. This arises through having a much larger volume for the buoyant actuator 19 than would be allowed by the prior art arrangements comprising a single pump and float as well as the fact that a large buoyant actuator attached to the tripod arrangement comprising the triangular base 17 and three pumps 15 disposed at inclined altitudes in shallow water is able to extract energy from the horizontal and vertical wave motions, the horizontal wave motions being relatively larger than the horizontal motions in deeper waters.

As mentioned earlier, the apparatus 11 operates in conjunction with a closed loop system according to the embodiment in which energy in the form of the high pressure fluid is exploited. In this embodiment the fluid comprises water and the closed loop system provides high pressure water for use in power generation or a desalination plant.

From the foregoing, it is evident that the buoyancy actuator according to the present embodiment provides a float which is relatively lightweight and which can be rendered effectively inoperative in adverse conditions for preservation.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The Claims Defining the Invention are as Follows:

1. A buoyant actuator comprising a body defining an exterior surface comprising a plurality of facets, and means for opening the body to permit water flow therethrough.

2. The buoyant actuator according to claim 1 wherein the facets are tessellated.

3. The buoyant actuator according to claim 1 wherein the body is generally spherical.

4. The buoyant actuator according to claim 1, wherein there are 36 facets, of which 12 comprise generally pentagonal facets and 24 comprise generally hexagonal facets.

5. The buoyant actuator according to claim 1 wherein the body is substantially hollow but comprises an internal support structure.

6. The buoyant actuator according to claim 5 wherein the internal support structure comprises a plurality of struts each having an outer end supporting one of the facets.

7. The buoyant actuator according to claim 4, wherein the body comprises 36 facets with 12 pentagonal facets and wherein there are 12struts, one supporting each pentagonal facet.

8. The buoyant actuator according to claim 5, wherein the internal structure comprises a central core and the struts extend radially from the central core.

9. The buoyant actuator according to claim 6, wherein each strut is configured at its radially outer end to define the respective facet.

10. The buoyant actuator according to claim 6 wherein the facets at the ends of the struts are connected to adjacent facets to provide integrity to the body.

11. The buoyant actuator according to claim 5 wherein the internal support structure is of buoyant construction.

12. The buoyant actuator according to claim 11 wherein buoyancy is provided by incorporating buoyant material in the construction of at least some of the struts and/or the central core.

13. The buoyant actuator according to claim 12, wherein the buoyant material is foam.

14. The buoyant actuator according to claim 1 wherein the means for opening the body is operable in response to exposure of the buoyant actuator to an aggressive sea state.

15. The buoyant actuator according to claim 1 wherein the plurality of the facets are configured as hinged flaps each pivotally movable between a closed condition which it normally occupies and which is in the plane of the facet, and an open condition in which it swings outwardly to establish the opening in an exterior surface.

16. The buoyant actuator according to claim 15 each such facet comprises a pair of the flaps hingedly connected together for pivotal movement between the closed and open conditions.

17. The buoyant actuator according to claim 15 wherein each flap is biased towards its closed condition.

18. The buoyant actuator according to claim 15, wherein a releasable coupling is provided for releasably maintaining each flap in the closed condition.

19. The buoyant actuator according to claim 18 wherein the releasable coupling is adapted to actuate to release the flap to allow it to move from the closed condition to the open condition to establish the opening in response to the adverse weather conditions.

20. The buoyant actuator according to claim 19 wherein the releasable coupling comprises a magnetic coupling.

21. The buoyant actuator according to claim 20 wherein the magnetic coupling comprises a plurality of magnets provided at locations along the free edge of the respective flap and/or at corresponding locations along corresponding edges of adjacent facets.

22. The buoyant actuator according to claim 20 wherein the body comprises 36 facets with 24 hexagonal facets and wherein at least some of the hexagonal facets are configured as two semi-hexagonal flaps.

23. The buoyant actuator according to claim 22 wherein each such hexagonal facet comprises two semi-hexagonal flaps.

24. A buoyant actuator comprising a body defining an exterior surface and a hollow interior, and means for opening the body to permit water to flow therethrough in response to exposure of the buoyant actuator to an aggressive sea state.

25. A buoyant actuator for immersion in a body of water, the buoyant actuator comprising a body defining an exterior surface and a hollow interior adapted to contain water from the body of water, the body comprising a plurality of openings for fluid flow between the hollow interior and the surrounding body of water, and a closure for each opening to block or at least inhibit fluid flow therethrough, the closure being adapted to move away from the opening to permit fluid flow therethrough in response to a predetermined fluid pressure differential imposed thereon between the hollow interior and the surrounding body of water.

26. A buoyant actuator for immersion in a body of water, the buoyant actuator comprising a body defining a hollow interior adapted to receive a volume of water from the surrounding water body, the body having openings through which water can flow between the hollow interior and the water body, and a flow control means for controlling flow through the hollow interior, the flow control means having a first condition for blocking or at least impeding fluid flow through the body and a second condition permitting fluid flow through the hollow interior.

27. The buoyant actuator according to claim 26 wherein the body defines an exterior surface and the openings are provided in the exterior surface.

28. The buoyant actuator according to claim 26 wherein the flow control means comprises a closure for each opening to block or at least inhibit fluid flow therethrough, the closure being adapted to move away from the opening to permit fluid flow therethrough.

29. The buoyant actuator according to claim 28 wherein the closure is configured as a flap movable between a closed condition in the plane of the exterior surface, and an open condition in which it swings away to establish the opening in the exterior surface.

30. A buoyant actuator for immersion in a body of water, the buoyant actuator comprising a body defining an exterior surface and a hollow interior, the exterior surface being configured to viscously couple with surrounding water, and means for establishing openings in the exterior surface to permit fluid flow between the surrounding water and the hollow interior.

31. A buoyant actuator for immersion in a body of water, the buoyant actuator comprising a body defining an exterior surface and a hollow interior, the exterior surface being configured to viscously couple with surrounding water, and a plurality of openings for fluid flow between the hollow interior and the surrounding water, and a closure for each opening to block or at least inhibit fluid flow therethrough, the closure being adapted to move away from the opening to permit fluid flow therethrough in response to a predetermined fluid pressure differential imposed thereon between the hollow interior and the surrounding water.

32. The buoyant actuator according to claim 31 wherein the closure is configured as a flap movable between a closed condition in the plane of the exterior surface, and an open condition in which it swings away to establish the opening in the exterior surface.

33. A wave energy conversion system comprising a buoyant actuator according to claim 1.

34. A wave energy conversion system according to claim 33 wherein the buoyant actuator is operably connected to an energy conversion device to translate wave action thereto.

* * * * *